United States Patent [19]
Fisher et al.

[11] Patent Number: 5,463,682
[45] Date of Patent: Oct. 31, 1995

[54] METHOD OF CREATING USER-DEFINED CALL PROCESSING PROCEDURES

[75] Inventors: Gregory M. Fisher, North Brunswick; Kathleen D. Cebulka, Piscataway; Susan K. Man, Holmdel; Zaher A. Nazif, High Bridge, all of N.J.; Lori J. Vinciguerra, Newtown, Pa.

[73] Assignee: Bell Communications Research, Inc., Livingston, N.J.

[21] Appl. No.: 972,501

[22] Filed: Nov. 6, 1992

Related U.S. Application Data

[63] Continuation-in-part of Ser. No. 934,240, Aug. 25, 1992, abandoned.

[51] Int. Cl.$^6$ .......................... H04M 3/42; H04M 11/00; H04M 15/00; H04M 7/00
[52] U.S. Cl. .................... 379/201; 379/94; 379/127; 379/207; 379/230; 395/159; 395/500
[58] Field of Search ................ 379/94, 112, 127, 379/142, 201, 207, 230; 395/159, 160, 161, 500

[56] References Cited

U.S. PATENT DOCUMENTS

| | | | |
|---|---|---|---|
| Re. 31,319 | 7/1983 | Fraser | 370/80 |
| 2,957,047 | 10/1960 | Wennemer | 379/211 |
| 3,564,149 | 2/1971 | Funk et al. | 379/222 |
| 3,576,398 | 4/1971 | Dejean et al. | 379/137 |
| 3,691,301 | 9/1972 | Zarouni | 379/114 |
| 3,867,582 | 2/1975 | Weed et al. | 379/198 |
| 3,881,060 | 4/1975 | Connell et al. | 379/50 |
| 3,931,476 | 1/1976 | Matthews | 379/22 |
| 3,934,095 | 1/1976 | Matthews et al. | 379/67 |
| 3,938,091 | 2/1976 | Atalla et al. | 379/197 X |

(List continued on next page.)

FOREIGN PATENT DOCUMENTS

| | | |
|---|---|---|
| 879364 | 8/1971 | Canada. |
| 1008956 | 4/1977 | Canada. |
| 1015857 | 8/1977 | Canada. |
| 1052472 | 4/1979 | Canada. |
| 1063704 | 10/1979 | Canada. |
| 1078048 | 5/1980 | Canada. |
| 1120164 | 3/1982 | Canada. |
| 1129054 | 8/1982 | Canada. |
| 1149916 | 7/1983 | Canada. |
| 1169597 | 6/1984 | Canada. |
| 1169985 | 6/1984 | Canada. |
| 1177981 | 11/1984 | Canada. |
| 1184637 | 3/1985 | Canada. |
| 1191920 | 8/1985 | Canada. |
| 1204881 | 5/1986 | Canada. |
| 1216349 | 1/1987 | Canada. |
| 1219325 | 3/1987 | Canada. |
| 1221444 | 5/1987 | Canada. |
| 1228659 | 10/1987 | Canada. |
| 1237804 | 6/1988 | Canada. |
| 1237805 | 6/1988 | Canada. |
| 1248616 | 1/1989 | Canada. |
| 1249382 | 1/1989 | Canada. |
| 1252861 | 4/1989 | Canada. |
| 1253241 | 4/1989 | Canada. |

(List continued on next page.)

*Primary Examiner*—Jeffery A. Hofsass
*Assistant Examiner*—Harry S. Hong
*Attorney, Agent, or Firm*—Leonard Charles Suchyta

[57] ABSTRACT

In a telecommunication network, a method of creating, in response to inputs from an operator, a user defined call processing node for a call processing record. The call processing record contains logically related nodes and branches. Initially, the operator instructs the processor that he or she wishes to construct a user defined call processing node. The processor then presents to the operator a display screen in which to construct the user defined call processing node and presents the operator with a list of predefined nodes. From this list, the operator selects predefined nodes and arranges them into an underlying representation of call processing procedures. Once this is completed, the processor enables the underlying representation of call processing procedures as a single node for use in creating call processing records.

3 Claims, 31 Drawing Sheets

U.S. PATENT DOCUMENTS

| | | | |
|---|---|---|---|
| 3,978,456 | 8/1976 | Moran | 395/275 |
| 4,054,756 | 10/1977 | Comella et al. | 379/89 |
| 4,068,099 | 1/1978 | Mikkola et al. | 370/62 |
| 4,093,819 | 6/1978 | Saito et al. | 178/2 R |
| 4,119,805 | 10/1978 | Pratelli | 379/244 |
| 4,139,739 | 2/1979 | von Meister et al. | 379/207 |
| 4,156,114 | 5/1979 | McLean | 379/250 |
| 4,162,377 | 7/1979 | Mearns | 379/127 |
| 4,191,860 | 3/1980 | Weber | 379/115 |
| 4,232,199 | 11/1980 | Boatwright et al. | 379/197 |
| 4,277,649 | 7/1981 | Sheinbein | 379/201 |
| 4,310,726 | 1/1982 | Asmuth | 379/207 |
| 4,313,035 | 1/1982 | Jordan et al. | 379/207 |
| 4,332,980 | 6/1982 | Reynolds et al. | 370/30 |
| 4,338,495 | 7/1982 | Bloch et al. | 379/158 |
| 4,345,116 | 8/1982 | Ash et al. | 379/221 |
| 4,348,554 | 9/1982 | Asmuth | 379/113 |
| 4,371,758 | 2/1983 | Ulrich | 379/25 |
| 4,436,962 | 3/1984 | Davis et al. | 379/211 |
| 4,479,196 | 10/1984 | Ferrer et al. | 395/600 |
| 4,520,235 | 5/1985 | Morikawa et al. | 379/164 |
| 4,538,031 | 8/1985 | Benning et al. | 379/103 |
| 4,545,043 | 10/1985 | Anderson et al. | 379/71 X |
| 4,555,594 | 11/1985 | Friedes et al. | 379/220 |
| 4,556,972 | 12/1985 | Chan et al. | 370/60 |
| 4,577,066 | 3/1986 | Bimonte et al. | 379/221 |
| 4,596,010 | 6/1986 | Beckner et al. | 370/60 |
| 4,611,094 | 9/1986 | Asmuth et al. | 379/201 |
| 4,653,090 | 3/1987 | Hayden | 379/204 |
| 4,656,624 | 4/1987 | Collins et al. | 370/60 |
| 4,665,514 | 5/1987 | Ching et al. | 370/60 |
| 4,688,214 | 8/1987 | DeWitt et al. | 370/60 |
| 4,695,977 | 9/1987 | Hansen et al. | 379/94 |
| 4,713,806 | 12/1987 | Oberlander et al. | 370/58.2 |
| 4,720,850 | 1/1988 | Oberlander et al. | 379/90 |
| 4,723,273 | 2/1988 | Diesel et al. | 379/211 |
| 4,737,983 | 4/1988 | Frauenthal et al. | 379/221 |
| 4,740,955 | 4/1988 | Litterer et al. | 370/67 |
| 4,747,127 | 5/1988 | Hansen et al. | 379/94 |
| 4,756,020 | 7/1988 | Fodale | 379/112 |
| 4,763,356 | 8/1988 | Day, Jr. et al. | 379/368 |
| 4,782,506 | 11/1988 | Sevcik | 379/10 |
| 4,782,517 | 11/1988 | Bernardis et al. | 379/201 |
| 4,782,519 | 11/1988 | Patel et al. | 379/221 |
| 4,794,642 | 12/1988 | Arbabzadah et al. | 379/200 |
| 4,811,378 | 3/1989 | Else et al. | 379/189 |
| 4,827,404 | 5/1989 | Barstow et al. | 395/500 |
| 4,835,683 | 5/1989 | Phillips et al. | 395/11 |
| 4,837,799 | 6/1989 | Prohs et al. | 379/224 |
| 4,860,204 | 8/1989 | Gendron et al. | 395/140 |
| 4,873,682 | 10/1989 | Irwin et al. | 370/58.1 |
| 4,878,240 | 10/1989 | Lin et al. | 379/67 |
| 4,893,310 | 1/1990 | Robertson et al. | 370/110.1 |
| 4,897,866 | 1/1990 | Majmudar et al. | 379/94 |
| 4,899,373 | 2/1990 | Lee et al. | 379/207 |
| 4,902,469 | 2/1990 | Watson et al. | 376/259 |
| 4,930,154 | 5/1990 | Bauer et al. | 379/246 |
| 4,942,540 | 7/1990 | Black et al. | 379/96 X |
| 4,953,204 | 8/1990 | Cuschleg, Jr. et al. | 379/266 |
| 4,972,453 | 11/1990 | Daniel, III et al. | 379/10 |
| 4,989,176 | 1/1991 | Khan | 395/275 |
| 5,008,929 | 4/1991 | Olsen et al. | 379/112 |
| 5,012,511 | 4/1991 | Hanle et al. | 379/211 |
| 5,019,961 | 5/1991 | Addesso et al. | 364/192 |
| 5,022,067 | 6/1991 | Hughes | 379/95 |
| 5,027,345 | 6/1991 | Littlewood et al. | 370/58.2 |
| 5,029,158 | 7/1991 | Reid et al. | 370/13.1 |
| 5,054,054 | 10/1991 | Pessia et al. | 379/89 |
| 5,056,134 | 10/1991 | Bauer et al. | 379/246 |
| 5,060,255 | 10/1991 | Brown | 379/67 |
| 5,067,149 | 11/1991 | Schneid et al. | 379/224 |
| 5,084,813 | 1/1992 | Ono | 395/700 |
| 5,095,505 | 3/1992 | Finucane et al. | 379/201 |
| 5,097,528 | 3/1992 | Gursahaney et al. | 379/67 |
| 5,136,585 | 8/1992 | Nizamuddin et al. | 370/110.1 |
| 5,136,631 | 8/1992 | Einhorn et al. | 379/67 |
| 5,323,452 | 6/1994 | Dickman et al. | 379/269 X |

FOREIGN PATENT DOCUMENTS

| | | |
|---|---|---|
| 1253939 | 5/1989 | Canada . |
| 1253986 | 5/1989 | Canada . |
| 1253987 | 5/1989 | Canada . |
| 1254978 | 5/1989 | Canada . |
| 1254980 | 5/1989 | Canada . |
| 1258548 | 8/1989 | Canada . |
| 1262272 | 10/1989 | Canada . |
| 1270337 | 6/1990 | Canada . |
| 1273088 | 8/1990 | Canada . |
| 1273089 | 8/1990 | Canada . |
| 2002018 | 8/1990 | Canada . |
| 2011562 | 10/1990 | Canada . |
| 1277016 | 11/1990 | Canada . |
| 1277791 | 12/1990 | Canada . |
| 2024245 | 4/1991 | Canada . |
| 2033880 | 7/1991 | Canada . |
| 1288154 | 8/1991 | Canada . |
| 1287925 | 8/1991 | Canada . |
| 1290431 | 10/1991 | Canada . |
| 1293830 | 12/1991 | Canada . |
| 1295750 | 2/1992 | Canada . |
| 1297565 | 3/1992 | Canada . |
| 2052105 | 4/1992 | Canada . |
| 1305773 | 7/1992 | Canada . |
| 1310390 | 11/1992 | Canada . |
| 1311286 | 12/1992 | Canada . |
| 2062102 | 12/1992 | Canada . |

FIG. 6A

| EXTENSION (502) | TELEPHONE NUMBER (504) |
|---|---|
| 1002 | (101) 555-1234 |
| 1004 | (901) 555-5678 |
| 4069 | (901) 501-5555 |

| | NAME | EXTENSION | TELEPHONE NUMBER |
|---|---|---|---|
| 508 | | | |
| 510 DATATYPE | | NUMERIC STRING | TELEPHONE |
| 512 MAXIMUM LENGTH | | 4 | 15 |
| 514 KEY | | YES | NO |

| | |
|---|---|
| 516 | HEADER |
| 506 | TABLE SPECIFICATION |
| 500 | TABLE DATA |

GSS EDITOR — 120

RECORD | VIEW | OPERATIONS | MSAP ADMINISTRATION | HELP

GSS

NAME: 800BASIC
CREATOR: SKK
MODIFIED: 05/13/92 11:46:48
ENABLED: 05/12/92

GSS DESCRIPTION

THIS GSS SPECIFIES THE BASIC FEATURES OF 800 SERVICE WITH DAY OF WEEK AND TIME OF DAY ROUTING. IT DISALLOWS PIN VALIDATION, SAMPLING, AND OTHER FEATURES IN THE 800ENHANCED GSS.

REQUIRED NODES

SELECTED NODES: CARRIER ROUTE TO — 126c

[ASSIGN] [DECIDE]
[ANNC & GET] [OTHER]

BILLINGIND
BILLINGNUM
BILLINGTYPE
BITSTRASSIGN
CARRIER
FLOATASSIGN
GENASSIGN
INTASSIGN
LOADCV
NATUREOFNUM

[ALL] [NONE]

OPTIONAL NODES

SELECTED NODES: DAY TIME — 128c

[ASSIGN] [DECIDE]
[ANNC & GET] [OTHER]

BILLINGIND
BILLINGNUM
BILLINGTYPE
BITSTRASSIGN
CARRIER
FLOATASSIGN
GENASSIGN
INTASSIGN
LOADCV
NATUREOFNUM

[ALL] [NONE]

SUCCESS

FIG. 29D

PLEASE ENTER A PRIMARY CARRIER NAME — 915b

PLEASE ENTER THE WEEKDAYS — 915c

M
TU
W
TH
F
SA
SU
M-F
SA-SU

M-F

☐ SELECT  PLACE BEFORE THIS ENTRY — 916a

☐ SELECT  PLACE BEFORE THIS ENTRY — 916a

☐ SELECT  PLACE BEFORE THIS ENTRY — 916a

☐ SELECT  PLACE BEFORE THIS ENTRY — 916a

PLACE AT THE END — 916a

PLEASE ENTER THE WEEKDAY ROUTING NUMBER  T908-699-2113 — 915d

PLEASE ENTER THE WEEKEND ROUTING NUMBER  T908-752-9567 — 915e

916

HELP

OK   RESET   CANCEL

METHOD OF CREATING USER-DEFINED CALL PROCESSING PROCEDURES

This application is a continuation-in-part application of U.S. patent application Ser. No. 07/934,240, entitled "System and Method for Creating, Transferring, and Monitoring Services in a Telecommunication System" by Nazif et al, filed Aug. 25, 1992 ("the incorporated interface application"), now abandoned, which is hereby incorporated by reference.

CROSS REFERENCE TO RELATED APPLICATIONS

This application is related to U.S. patent application Ser. No. 629,371, entitled "Systems and Processes Providing Programmable or Customized Customer Telephone Information Services," by Ely et al., now U.S. Pat. No. 5,241,588; U.S. patent application Ser. No. 629,373, entitled "Systems and Processes Specifying Customized Customer Telecommunication Services Using a Graphical Interface," by Ely et al., now abandoned; U.S. patent application Ser. No. 629,390, entitled "Systems and Processes for Visualizing Execution of Customer Services," by Ely et al., now abandoned; U.S. patent application Ser. No. 629,389, entitled "Systems and Processes for Validating Customer Services," by Babson, now U.S. Pat. No. 5,241,580; U.S. patent application Ser. No. 629,447, entitled "Systems and Processes for Providing Multiple Interfaces for Telephone Services," by Ely et al., now U.S. Pat. No. 5,315,646. Each of the foregoing applications was filed on Dec. 18, 1990. These applications are referred to together herein as "the set of incorporated patent applications." The contents of each of the foregoing patent applications is hereby incorporated by reference.

This application is also related to U.S. Pat. application Ser. No. 07/629,372, entitled "Visual Programming of Telephone Network Call Processing Logic," by B. N. Dickman et al., filed on Dec. 18, 1990, now U.S. Pat. No. 5,323,452.

This application is also related to U.S. patent application Ser. No. 07/746,487, entitled "A Personal Number Telephone Service," by Richard A. Orriss, filed on Aug. 16, 1991, now abandoned. The contents of this patent application is hereby incorporated by reference.

BACKGROUND OF THE INVENTION

The present invention relates generally to the field of customized services, and more specifically to the problems of creating, testing, validating, and provisioning customized telecommunication services.

The incorporated patent applications describe a system and method for creating and executing customized telecommunication services tailored to subscribers' or customers' needs. The system of the set of incorporated patent applications includes a service creation environment for creating customized telephone services and a service execution environment for executing the telephone services. The service creation environment includes a graphical user interface which permits a user to build and/or change a displayed graphical representation of a desired service using "nodes," "decision boxes," and "branches." Each node represents a high level instruction for the execution of the service. The displayed graphical representation of the service is translated to a binary representation and stored as a call processing record (CPR). CPRs are transmitted from a creation environment to an execution environment where they are executed during call processing operations to send call processing instructions to inquiring switches.

The system and method for creating and executing customized telephone services described in the set of incorporated patent applications are described as being implemented in the Advanced Intelligent Telephone Network (AIN).

FIG. 1 illustrates an exemplary AIN comprising System Service Points (SSPs) 30, 35, 40, and 45, Signal Transfer Points (STPs) 48 and 50, Service Control Points (SCPs) 10 and 20, and Service Management Systems (SMS) 60 (only one shown). SSPs are central office switching systems which receive telephone calls from telephones 12. Each SSP recognizes a variety of "triggers" within customer telephone call signals and generates queries to SCPs based on the triggers. The SSPs then process customer calls in response to commands received from the SCPs.

The SCPs communicate with the SSPs over a common-channel-signalling (CCS) network 67 that includes STPs 48 and 50. The CCS network 67 employs communication channels separate from channels used to transport customer voice signals and includes a packet-switching system. The CCS network 67 switches data in packets instead of allocating circuits for the duration of a call. The STPs 48 and 50 provide the packet-switching functions.

Each SCP is fault tolerant because each SCP includes processors connected through dual local-area networks (not shown). If one processor of an SCP fails, another processor of the SCP can ensure that the SCP continues to function. Further, SCPs are configured as a mutually mated pair in different locations. If an SCP, such as SCP 10, is disabled, its mate, SCP 20, can ensure that telephone service continues without interruption.

Associated with each SCP or each pair of SCPs is an SMS 60. An SMS 60 provides a support interface through which customer data and service logic can be added or managed.

The set of incorporated patent applications also disclose techniques for testing and validating CPRs that have been created at a creation environment. Testing of a CPR provides a visual indication on a displayed graphical representation (graph) of the CPR of the execution path taken through the CPR during a call processing operation. The visual indication is described in one embodiment as a red line trace of the paths connecting the nodes of a displayed graph. Validating a CPR involves detecting logical infractions in the processing routine of the CPR and identifying these infractions to an operator based on a set of rules and a knowledge base understood by an expert system.

The set of incorporated patent applications describe a plurality of fixed or predefined nodes for creating call processing services. Services can be created using only these fixed or predefined nodes. Although these nodes provide a great deal of service creation flexibility, because only certain nodes are available, service creation flexibility is limited to a certain extent.

To add additional flexibility to the creation of call processing services, the set of incorporated patent applications further describe custom nodes for which a user can define individual expression values. These custom nodes are beneficial in that they provide for the specification of individual user data; however, they are limited in that their functionality remains fixed.

Some service creators or providers may have a particular call processing routine that gets incorporated into many CPRs. It would be very efficient and beneficial to be able to instantiate that call processing routine into CPRs as a single node. These benefits would be further enhanced if such a node were indistinguishable to the system. In other words, if the system could process the node as if the entire underlying call processing routine were included in the CPR.

Accordingly, it is desirable to improve system flexibility for creating call processing services.

It is also desirable to provide for the creation of single nodes having underlying CPRs associated therewith.

It is also desirable to provide for the creation of a CPR and the instantiation of that CPR as a single node for use in other CPRS.

It is further desirable to provide for the design, layout, and instantiation of user-defined nodes that are indistinguishable from other predefined nodes from the perspective of the service creation and execution environments.

Additional desires of the invention will be set forth in the description which follows, and in part will be apparent from the description, or may be learned by practice of the invention. The advantages of the invention may be realized and obtained by means of the instrumentalities and combinations particularly pointed out in the appended claims.

DISCLOSURE OF THE INVENTION

To achieve the foregoing desires and objects, and in accordance with the purposes of the invention as embodied and broadly described herein, the present invention provides a method of creating a user-defined call processing node for a call processing record, the call processing record comprising logically related nodes and branches, the method comprising the steps, executed by a processor, of: receiving an instruction from an operator to construct a user-defined call processing node; presenting to the customer a screen in which to construct the user-defined call processing node; constructing an underlying representation of call processing procedures selected by the operator; and enabling the underlying representation of call processing procedures as a single node for use in creating call processing records.

BRIEF DESCRIPTION OF THE DRAWINGS

The accompanying drawings, which are incorporated in and constitute a part of the specification, illustrate presently preferred implementations of this invention and, together with the general description given above and the detailed description of the preferred implementations given below, serve to explain the principles of the invention.

In the drawings:

FIG. 6A illustrates a Table in accordance with one embodiment of the present invention;

FIG. 6B illustrates a Table Specification in accordance with one embodiment of the present invention;

FIG. 6C illustrates a Table Record in accordance with one embodiment of the present invention;

FIG. 12 illustrates a GSS Editor screen showing an exemplary GSS in accordance with one embodiment of the present invention;

FIG. 29D illustrates a Template Layout Editor screen in accordance with one embodiment of the present invention.

BEST MODE FOR CARRYING OUT THE INVENTION

Figure 1:
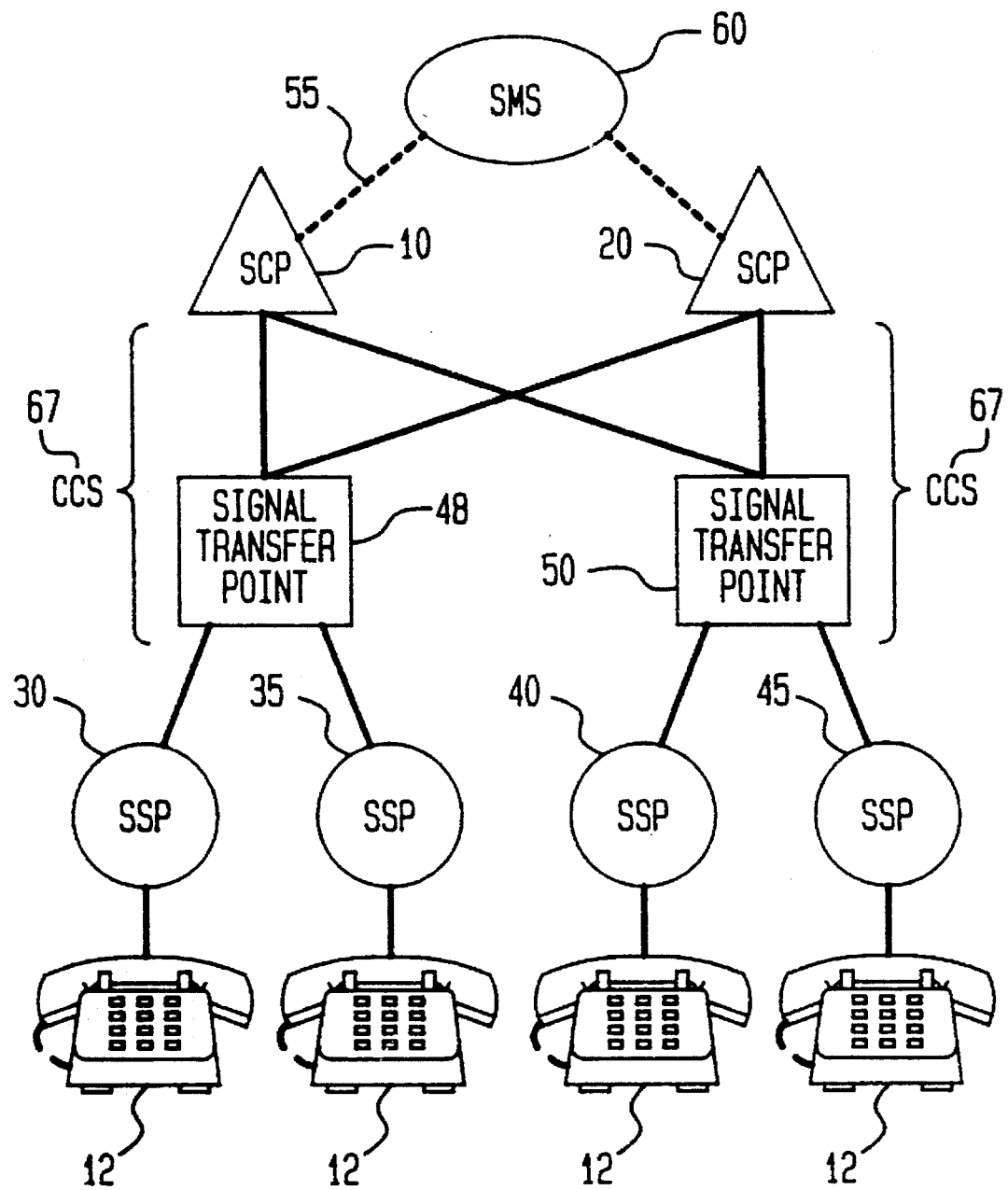
FIG. 1 is a block diagram of the Advanced Intelligent Telephone Network (AIN)

Reference will now be made in detail to the construction and operation of the preferred implementations of the present invention which are illustrated in the accompanying drawings. In the drawings, like elements and operations are designated by like reference numbers. The following description of the preferred implementations is exemplary, and does not limit the invention to these specific implementations A. System Configuration In a preferred embodiment of the present invention, a service is created in the AIN. In particular, a service is created by a user at a workstation associated with the SMS 200.

Figure 2A:
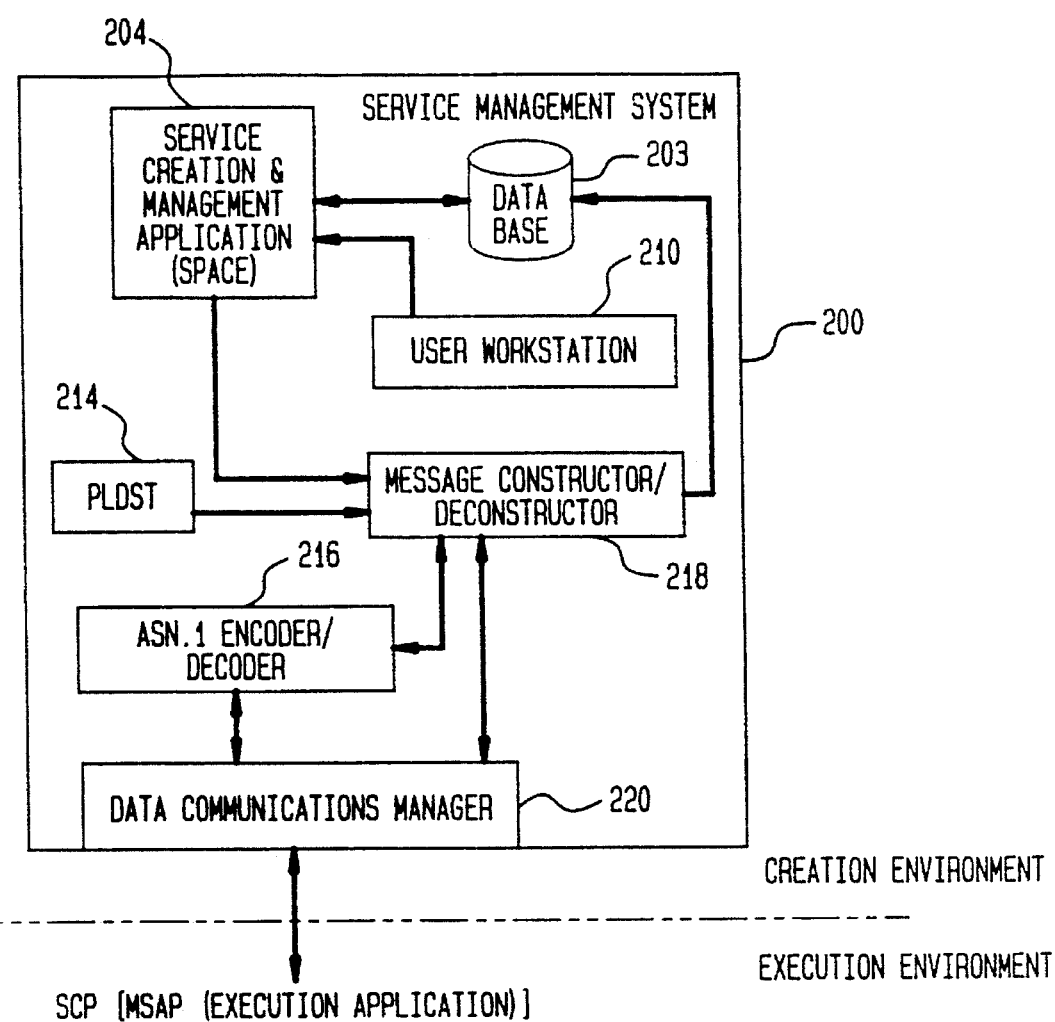
FIG. 2A is a block diagram illustrating a service creation environment in accordance with one embodiment of the present invention.

FIG. 2A is a block diagram of a preferred embodiment of an SMS 200 in accordance with the present invention. The SMS 200 includes a service creation and management application 204 which preferably comprises the SPACE® application version 2.0. SPACE is a proprietary software application owned by Bellcore, the assignee of this application.

In addition to the service creation and management application 204, SMS 200 includes a user workstation 210. Preferably, user workstation 210 (also shown in FIG. 2B) includes an IBM RS-600 (Model 320) as well as related equipment, for example, processor 230, keyboard 250, mouse 260, and graphical display 240 which preferably runs AIX windows (IBM), version 3.2 or X-windows, version 11, release 4 or later.

The SMS 200 also includes database 203, Programming Language Data Structure Translator (PLDST) 214, ASN.1 Encoder/Decoder 216, Message Constructor/Deconstructor (Message C/D) 218, and Data Communications Manager 220. These elements, their relationships, and their relationship to the execution environment in an SCP 10, 20 are described in the incorporated interface application.

The service creation portion of the SPACE application is dedicated to the creation of CPRs and Tables (described below). As described in the set of incorporated patent applications, CPRs are created using the SPACE application by generating a high level, displayed representation (graph) of the desired service on the display 240 of user workstation 210. The displayed graph of a CPR is extremely useful in that it permits an operator to create and understand the telephone service being created and to test and validate the service logic. However, the graph cannot be interpreted efficiently directly by the execution environment. Accordingly, the CPR graph is translated into a binary representation which can be used to process calls in the execution environment.

B. Software Configuration

Figure 3:
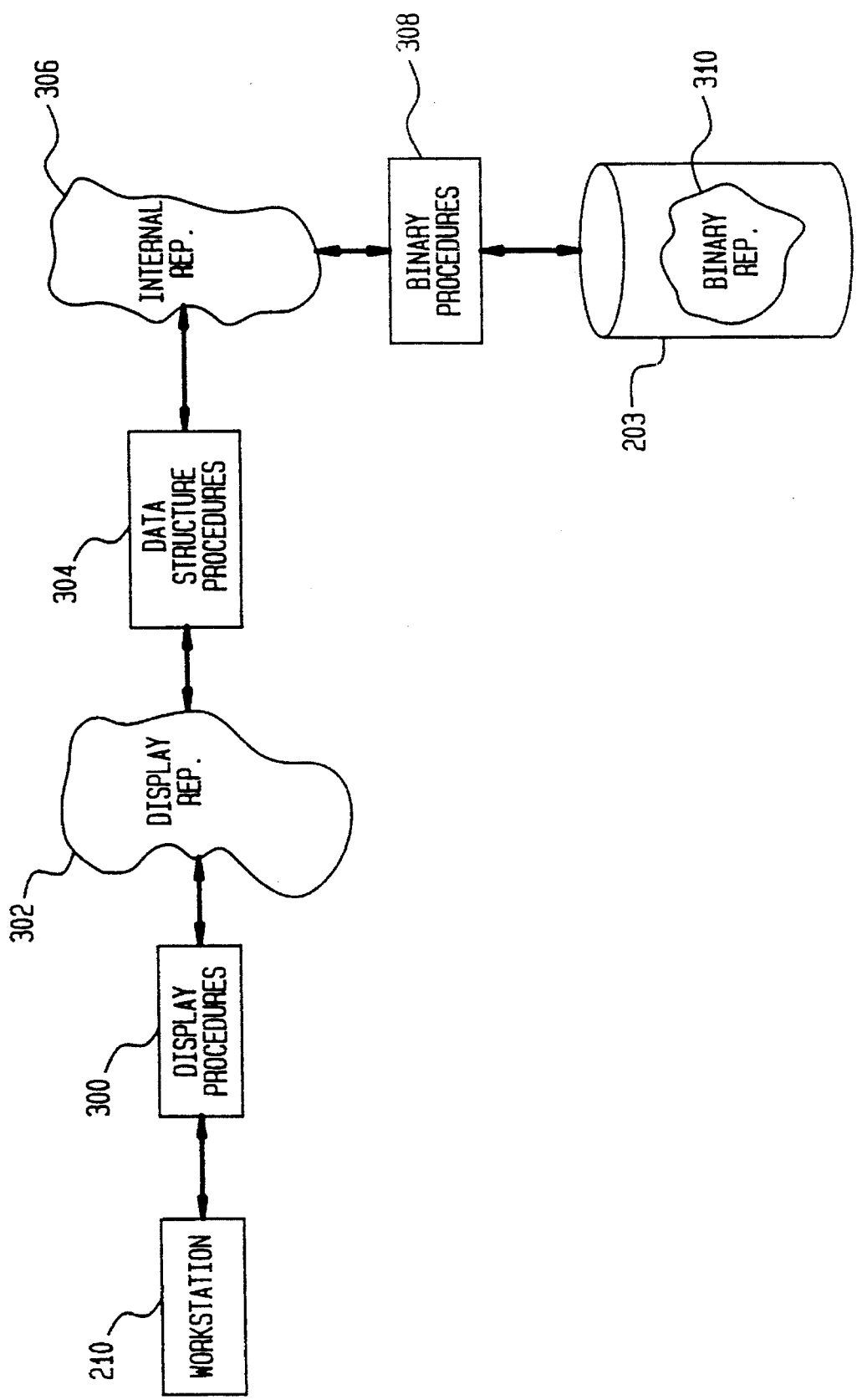
FIG. 3 is a procedure diagram for a service creation environment in accordance with one embodiment of the present invention.

In a preferred embodiment, before a CPR graph is translated into a binary representation, it is first translated into an internal representation comprising data structures and pointers. These translations and representations are shown in FIG. 3, wherein display procedures 300 generate the display representation 302 of the CPR, data structure procedures 304 generate the internal representation 306, and binary procedures 308 generate the binary representation 310 of the CPR, which is stored in database 203.

Preferably, the display procedures 300 are designed according to an object-oriented design methodology using the C++ language. Accordingly, the data structure procedures 304 are also object-oriented. The data structure procedures 304 are less machine dependent than the display procedures 300 because the data structure procedures 304 can be used with many different display forms and many different types of hardware. The binary representation 310 of the CPR is the most machine independent.

Each of the foregoing display, data structure, and binary data procedures is established in the SPACE application by one or more software "modules." Modular programming allows individual procedures or functions to be distinctly represented during design, and individually exercised during execution. A defined module may interactively "call" or invoke another module.

1. Display and Editing Modules

Figure 4A:
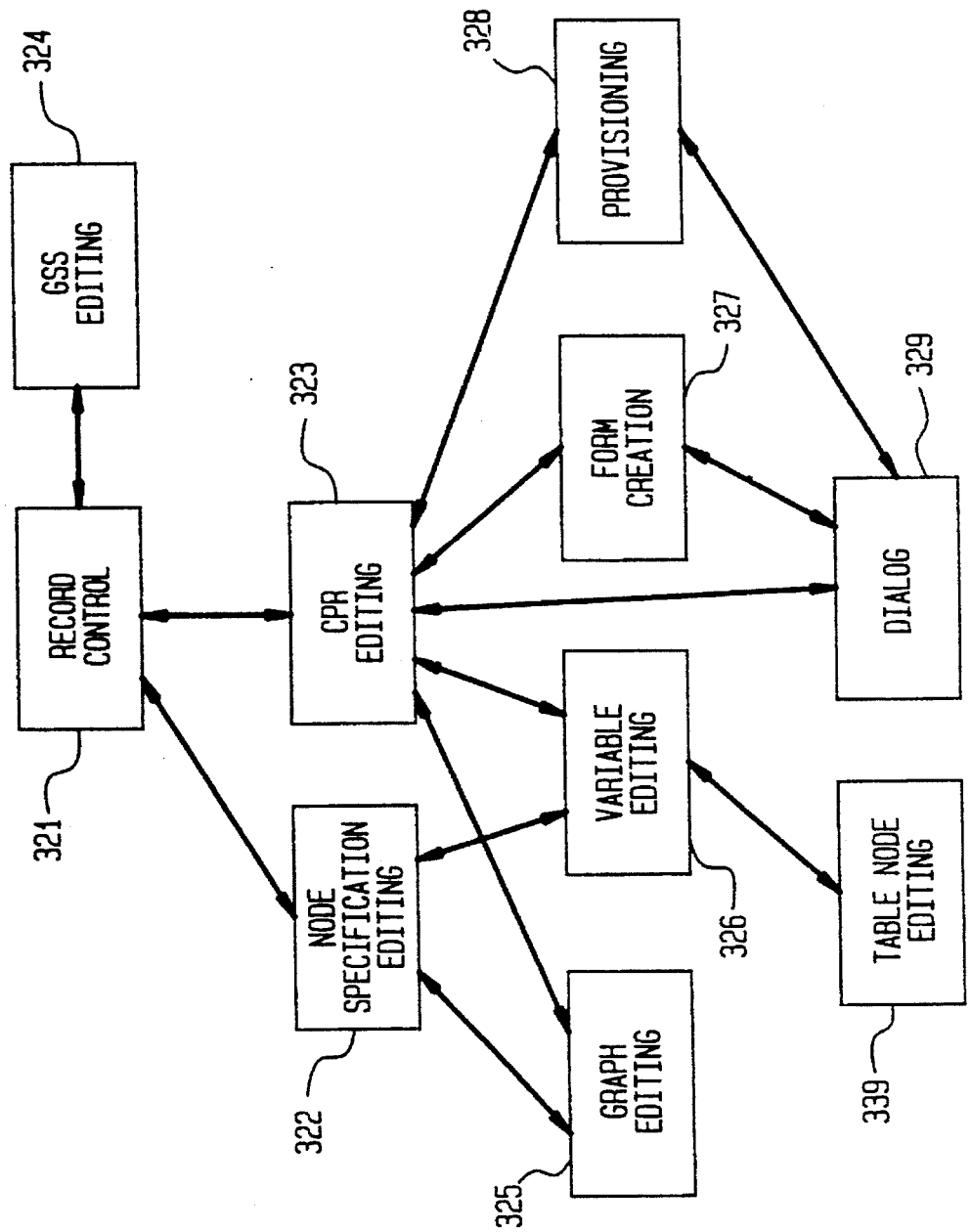
FIG. 4A is a schematic representation of software modules corresponding to display and editing procedures of the software in accordance with one embodiment of the present invention.

In a preferred embodiment, the display procedures 300 of FIG. 3 include display and editing modules. The display and editing modules display various graphical objects on the display 240 of workstation 210 and allow manipulation of the graphical objects by the user. The display and editing modules, as shown in FIG. 4A, include Record Control module 321, Node Specification Editing module 322, CPR Editing module 323, GSS Editing module 324, Graph Editing module 325, Variable Editing module 326, Form Creation module 327, Provisioning module 328, Table Node Editing module 339, and Dialog module 329.

Record Control module 321 interfaces Database module 340 (FIG. 4C) with each of the editing modules (modules 322, 323, 324, 325, 326, and 339) to transfer data from database 203 to editor buffers (not shown) associated with the respective editing modules in the workstation 210 and to transfer (save) data from the editor buffers to database 203. Record Control module 321 also allows a user to prepare a template (described below in section G) for a mass market service.

CPR Editing module 323 allows a user to change the characteristics (i.e., headers, entry points, etc., as described below) of a CPR. To do so, CPR Editing module 323 invokes the Graph Editing module 324 and the Variable Editing module 326 to change corresponding portions of the CPR. The CPR Editing module 323 also allows editing of existing templates.

Graph Editing module 325 allows a user to manipulate the structure or relationship of nodes and branches in a graph. Thus, in conjunction with the Node Specification Editing module 322 and Variable Editing module 326, which allows manipulation of call variables within nodes, the Graph Editing module 325 also allows graphs to be edited and translates the corresponding internal data structures into graphical display representations for display on the display 240 of workstation 210. In addition, the Graph Editing module 324 allows a user to graphically display and edit the structure or relationship of nodes and branches in a template.

Call Variable Editing module 326 allows a user to add, delete, and modify call variables. Call variables (also referred to as "CVs") identify data elements whose values are processed by CPRs. Before a call variable can be used, it must be defined. CVs can be predefined or user-defined. User-defined CVs can be defined for specific services being created. An example of a user-defined CV is a counter used to count the number of times a loop has been executed. To define a call variable, the following attributes are preferably specified: tag name, scope, extent, data type, and optional initial value. The tag name is a name which identifies the CV. For example, MTOD is the tag name for a time of day CV, MDOW is the tag name for a day of week CV, and QDIALEDNBR is the tag name for a dialed number CV. Scope determines the visibility, e.g. global or local. The extent determining how long the value lasts, e.g. persistent or nonpersistent. The value of a global CV is available to all graphs interpreted during call processing of a call query. The value of a local CV is available only to the graph in which it is defined. A persistent CV maintains its value from one call to another. Data type refers to the type of data stored in the CV, which can be, for example, a string or an integer. An optional initial value can be any valid value of the data type indicated for the CV.

Preferred data types include:

a. Signed Integer—This data type is a positive or negative number or zero.

b. Bit String—This data type is a string of binary bits that represent logical values. To be recognized, the bit string preferably begins with the letter "B."

c. Telephone Number—The telephone number data type represents values of telephone numbers. To be recognized, the telephone number preferably begins with a letter from the set T, S, I, and P, where, T = National Telephone Numbering Plan, [ = International Number, S = Special Number, and P = Private Number.

d. String—This data type is a string of characters.

e. Numeric String—This data type is a string of digits, "#," or "*," as can be entered from a telephone keypad.

f. Date—This data type represents a date.

g. Day of Week (DOW)—This data type is used to represent the days of the week.

h. Time of Day (TOD)—This data type is used to represent the time of day.

i. Carrier—The Carrier data type is used to represent an Inter- or Intra-LATA Telephone Carrier Company Designation. For example, LEC, ATX, or 222.

j. Boolean—This data type is used to represent one of only two possible values such as true/false or yes/no.

k. Float—This data type is used to represent a floating point number. The precision is determined by storage restrictions.

l. Signaling Point Code—This data type represents information about network signaling.

m. Measurement Vector—This data type represents a vector of counters.

n. Table—This data type is a table of rows and columns where data is stored (see Section C.2 below).

The Variable Editing module 326 is also used to restrict input values, identify data for templates, and specify user prompt language. In addition, the Variable Editing Module 326 is used to define user input parameters when creating User Defined Nodes (described below in Section F.5).

General Service Specification (GSS) Editing module 324 is used to retrieve, display, and edit a GSS (described below in section E).

Node Specification Editing module 322 allows a user to change the characteristics of a node specification, and thereby define a custom or User-defined node. This module invokes the Graph Editing module 324 and the Variable Editing module 326 as needed to change corresponding portions of the node specification.

Dialog module 329 provides a set of utilities and procedures called by other editing and display modules. The procedures defined in Dialog module 329 facilitate data entry and/or option selection by the user. These procedures include procedures for defining dialog boxes, which query the user regarding data required for particular inputs and accept the user's input data.

Form Creation module 327 allows a user to create a new user interface for a template. The user interface preferably comprises a displayed list of user prompts and input fields which allow a user to create a CPR from a template.

Provisioning module 328 translates internal data structures into a user interface form. The particular characteristics of the form depend on the data structures of the template created by Form Creation module 327. The Provisioning module 328 also presents available templates, verifies user permissions for templates, and monitors processes for activation of a template based CPR.

Table Node Editing module 339 allows a user to define, edit, and manipulate values in a table data structure. The Table Editing module 339 is invoked by the Variable Editing module 326. As with values appearing within nodes, table values may be expressed in a variety of data types as explained above, with the exception of measurement vector and table data types.

2. Data Structure Modules

Figure 4B:
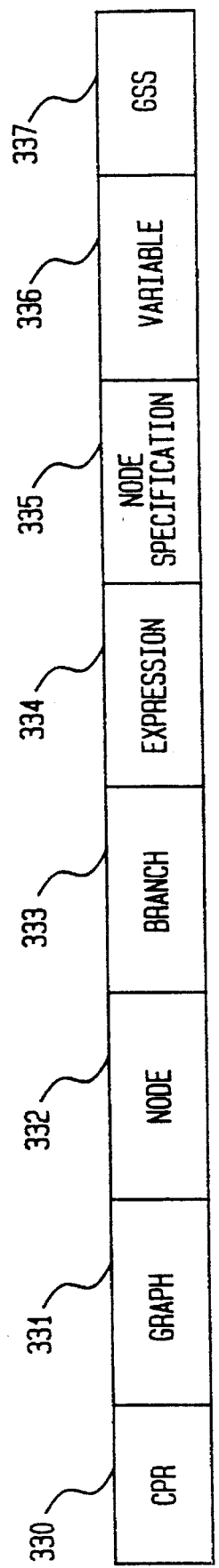
FIG. 4B is a schematic representation of software modules corresponding to data structure procedures of the software in accordance with one embodiment of the present invention.

As shown in FIG. 4B, the data structure procedures 304 in FIG. 3 preferably include the following data structure modules: CPR module 330, Graph module 331, Node module 332, Branch module 333, Expression module 334, Node Specification module 335, Variable module 336, and GSS module 337. Each of these data structure modules is particularly related to one or more data structure types.

Upon creation of a graph, the Graph module 331 is invoked to define the data structure which results upon creation of the logical relation between branches and nodes in the graph. Within the Graph module 331, data structures representing individual branches within the graph are further defined by the Branch module 333. Thus, at points in the graph where a branch is required, the Graph module 331 invokes the Branch module 333. Data structures representing individual nodes within the graph are further defined by the Node module 332. Thus, at points in the graph where a node is required, the Graph module 331 invokes the Node module 332. Similarly, expressions within a node are defined by the Expression module 334, which is called as necessary by the Node Specification Editing module 332.

As previously described, preferred implementations of the present invention use object-oriented programming techniques. One aspect of object-oriented programming is that all functions operable upon a particular "object" are defined with the object. Thus, all functions operable upon a graph ("the object") are defined within the Graph module 331. Accordingly, each data structure module preferably represents the data structure (i.e., defines the structure) and allows manipulation (i.e., defines the operable functions) of that data structure. Data structure modules may also use subordinate data structure modules as described above.

CPR module 330 internally represents and allows manipulation of graphs and call variables which define a customer service. This module also handles the representation and manipulation of templates. The CPR module also includes administrative information such as, for example, record ownership and status information. The CPR module 330 invokes Graph module 331 and Variable module 336.

Graph module 331 represents and allows manipulation of the logic section of a graph or the graph section of a User-defined node. Graph module 331 invokes Node module 332 and Branch module 333. It also includes validation information.

Node module 332 represents and allows manipulation of objects corresponding to a single call processing instruction. The single call processing instruction may include complex nodes such as table nodes (described below in Section F.6) and administrative nodes (described below in Section F.3). Node module 332 also includes validation information for a particular node. Node module 331 invokes Node Specification module 335 and Expression module 334.

Branch module 333 represents and handles manipulation of branches within a graph. Branch module 333 invokes Expression module 334 to define conditional branches.

Expression module 334 represents and handles manipulation of data values in CPRs and tables. An expression is a construct that has a value when evaluated. The value that is returned preferably has a data type. The expression is the basic unit of data manipulation. For example, an assignment node (described below in Section F.1) consists of a left-hand part, which is an expression, an assignment operator, and a right-hand part, which is an expression. Expressions can be constants, call variables, or manipulators as defined in the incorporated interface application. In addition, the Expression module 334 includes information about the use of an expression in a template and the presentation of an expression.

Node Specification module 335 represents and handles manipulation of different node types. Node specifications determine for each respective node what type of information is needed by node and how each node will be interpreted by the call processor. The Node Specification module 335 also reads a set of predefined node specifications from a series of system files and typically invokes the Variable module 336 and Expression module 334.

Call Variable module 336 represents and handles manipulation of different types of call variables used in graphs and data sections of CPRs. This module reads a set of variable expressions from a series of files in the database 203. A preferred implementation provides for two types of variables: call variables used in CPRs and node specification parameters used in user-defined nodes.

Generic Service Specification (GSS) module 337 represents and handles manipulation of objects which specify the type of service a graph may represent.

3. Database and Related Processing Modules

Figure 4C:
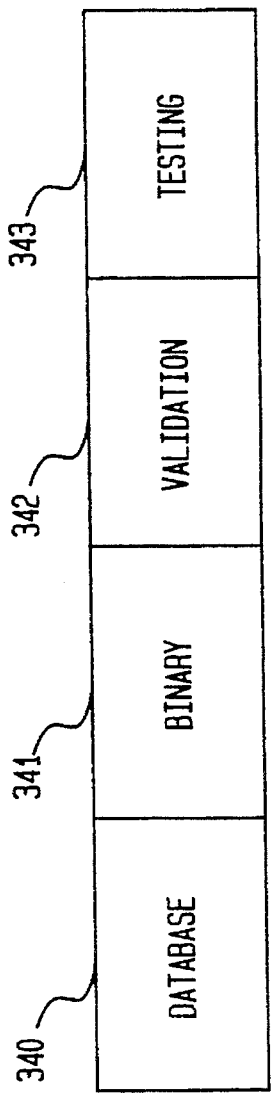
FIG. 4C is a schematic representation of software modules corresponding to binary and other related procedures of the software in accordance with one embodiment of the present invention.

As shown in FIG. 4C, the binary procedures 308 in FIG. 3 preferably include Database module 340, Binary module 341, Validation module 342, and Testing module 343. Binary module 341 converts various internal data structures into binary representations that can be transferred between different hardware configurations. This module also performs the reverse process of converting binary representations of CPRs and tables into internal data structures.

Database module 340 stores, retrieves, deletes, and searches on CPRs, templates, user-defined nodes, GSSs, and tables in database 203.

Validation module 342 facilitates CPR validation procedures.

Finally, Testing module 343 simulates call processing execution and produces a resulting "processed" binary representation.

C. System Records

The foregoing hardware and software components cooperate to allow a user to create customer services. Preferably, services are created by the formation of two types of system records: CPRs and tables.

1. CPR Structure

Figure 5:
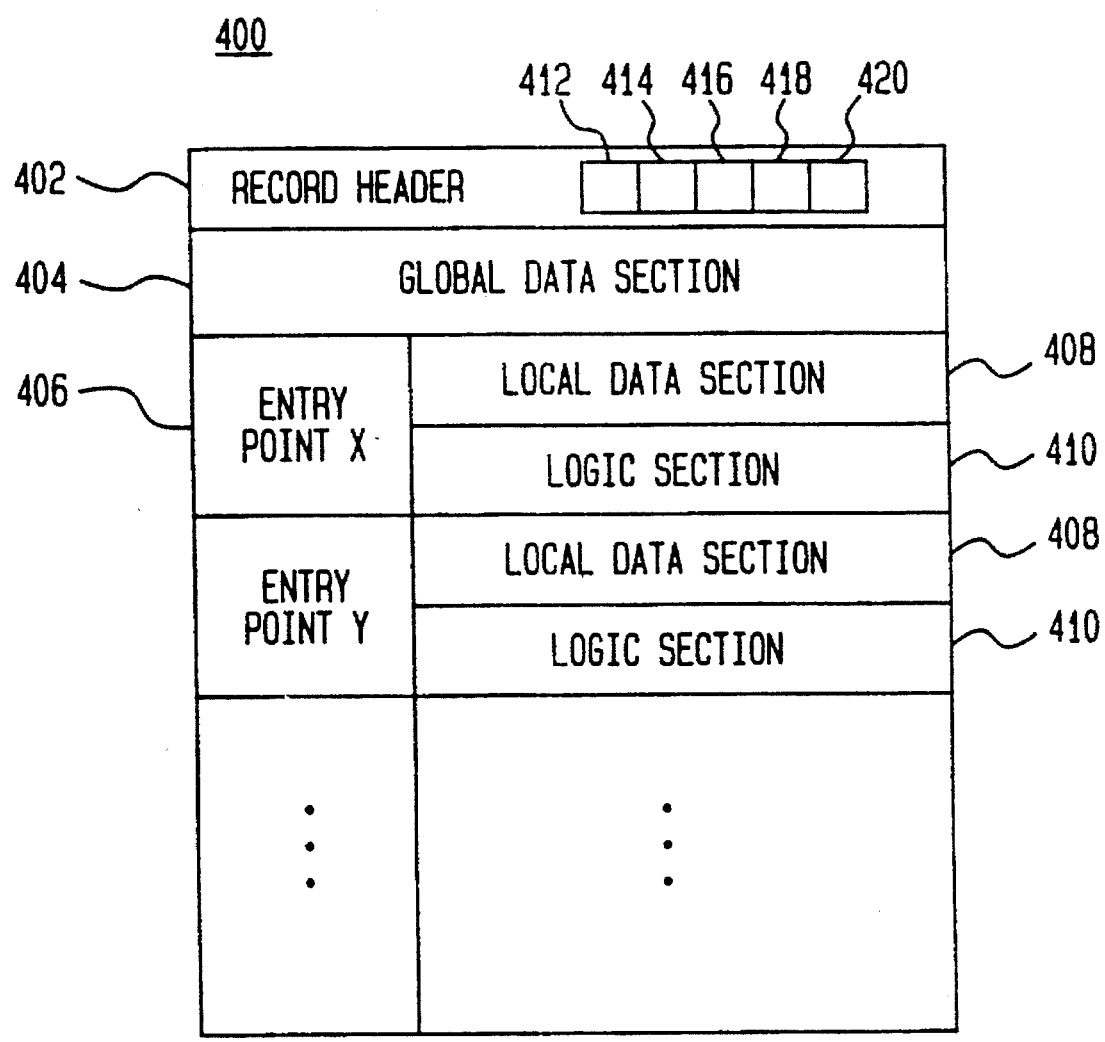
FIG. 5 illustrates the structure of a CPR in accordance with one embodiment of the present invention.

FIG. 5 illustrates a preferred structure or organization of a CPR. The CPR structure 400 includes a CPR record header 402, a global data section 404, entry points 406, local data sections 408, and logic sections 410.

a. CPR Record Header

Each CPR is assigned a unique record header 402 to identify the CPR and associate the CPR to a customer. The record header 402, (also referred to as the CPR key) can be, for example, a ten-digit telephone number. The record header 402 also includes data that characterizes the CPR. For example, the record header 402 may also include a code 412 indicating whether the CPR is "shared" or non-shared. Shared CPRs are used in performing services for multiple subscribers, while non-shared CPRs are used for only one subscriber. The designation of whether a CPR is shared is made by the user. Whether a CPR is shared or non-shared does not change its structure. Shared CPRs are labeled to allow an execution environment to improve performance capabilities by storing shared CPRs in a manner that provides faster access time. The record header 402 may also contain a code 414 indicating whether a CPR can update CPRs or tables in the execution environment and requesting a copy of these updates, and a code 416 indicating whether the CPR controls updating of CPRs and tables in the execution environment. The record header may include a test code 418 to label the CPR as a test CPR. The record header may also include a trace flag 420 which, as described in the incorporated patent applications, requests a trace of the execution path through the graph.

b. Global Data Section

The global data section 404 includes global data used by the logic of all logic sections 410 within the CPR 400. This global data may include, for example, declarations and/or definitions of call variables, embedded tables, and measurement vectors.

c. Entry Points

An entry point in a CPR is a point at which call processing can be initiated. Each entry point corresponds to a previously defined graph and an associated local data section, the interpretation and execution of which establishes a customer service. As seen from FIG. 5, a CPR may have more than one entry point; hence, all of a customer's services may be provided on a single CPR.

A user may assign any name to an entry point. Entry points are preferably grouped as "trigger" and "non-trigger" entry points. For example, two entry points have special significance in the execution environment: (1) "ani" which is called to process an originating number query; and (2) "dln" which is called to process a called number query.

Non-trigger type entry points are preferably used by other entry points within the CPR or other CPRs.

d. Local Data Sections

As shown in FIG. 5, each entry point 406 is associated with a local data section 408. The local data section 408 includes local data used only by the corresponding logic section of the associated entry point. This local data includes definitions of call variables of local scope.

e. Logic Sections

Logic section 410 contains the actual call processing logic or call processing procedure corresponding to a particular graph or service.

When a SCP 202 processes a CPR in the execution environment, after having retrieved the CPR based on the CPR record header 402, SCP 202 reads the global data section 404 and applies all call variable definitions found therein. The SCP 202 then selects an entry point based on a received trigger. The SCP 202 reads the local data from local data section 408 associated with the entry point 406. The call processing logic of the associated logic section 410 is then interpreted using all the data that has been applied.

2. Tables

In accordance with the present invention, tables may be used to store lists of values used in processing one or more CPRs. Tables (also referred to herein as value lists) can be created as stand-alone records or embedded within CPRs. As described below, stand-alone tables are identified by a user, embedded tables are identified using a "Table" call variable.

Tables are defined by a table specification and table data. The table data is laid out in one or more rows corresponding to predefined columns. The table specification defines these columns including data type, maximum size, and whether they are a key column.

FIGS. 6A and 6B illustrate the table data and table specification for a table that associates telephone extensions of an office building with a selected telephone number having a maximum length of 15 digits.

The table 500 in FIG. 6A includes two columns: the first column 502 lists the number of extensions in the office building, and the second column 504 lists the telephone numbers associated with each of the three exemplary extensions.

FIG. 6B illustrates the table specification 506 for the table 500 shown in FIG. 6A. The table specification includes four rows: name 508, data type 510, maximum length 512, and key 514. The information defined by these four rows is specified for each of the columns of table data. Thus, as shown in FIG. 6B, the name of the first column is "EXTENSION," and the name of the second column is "TELEPHONE NUMBER." The data type of the EXTENSION column is a numeric string, and the data type of the TELEPHONE NUMBER column is a telephone data type. The maximum length of the numeric string in the EXTENSION column is four digits, and the maximum length of the TELEPHONE NUMBER in the telephone column is 15 digits. The key specification 514 permits a user to specify which column uniquely identifies a row and allows for more efficient search.

FIG. 6C illustrates a table record structure 518 for a stand alone table. As shown, the structure includes a header section 516, the table specification 506 as shown in FIG. 6B, and the table data 500 as shown in FIG. 6A. For embedded tables, the table specification 506 and table data 500 are stored as part of the call variable that denotes the embedded table.

Figure 7:
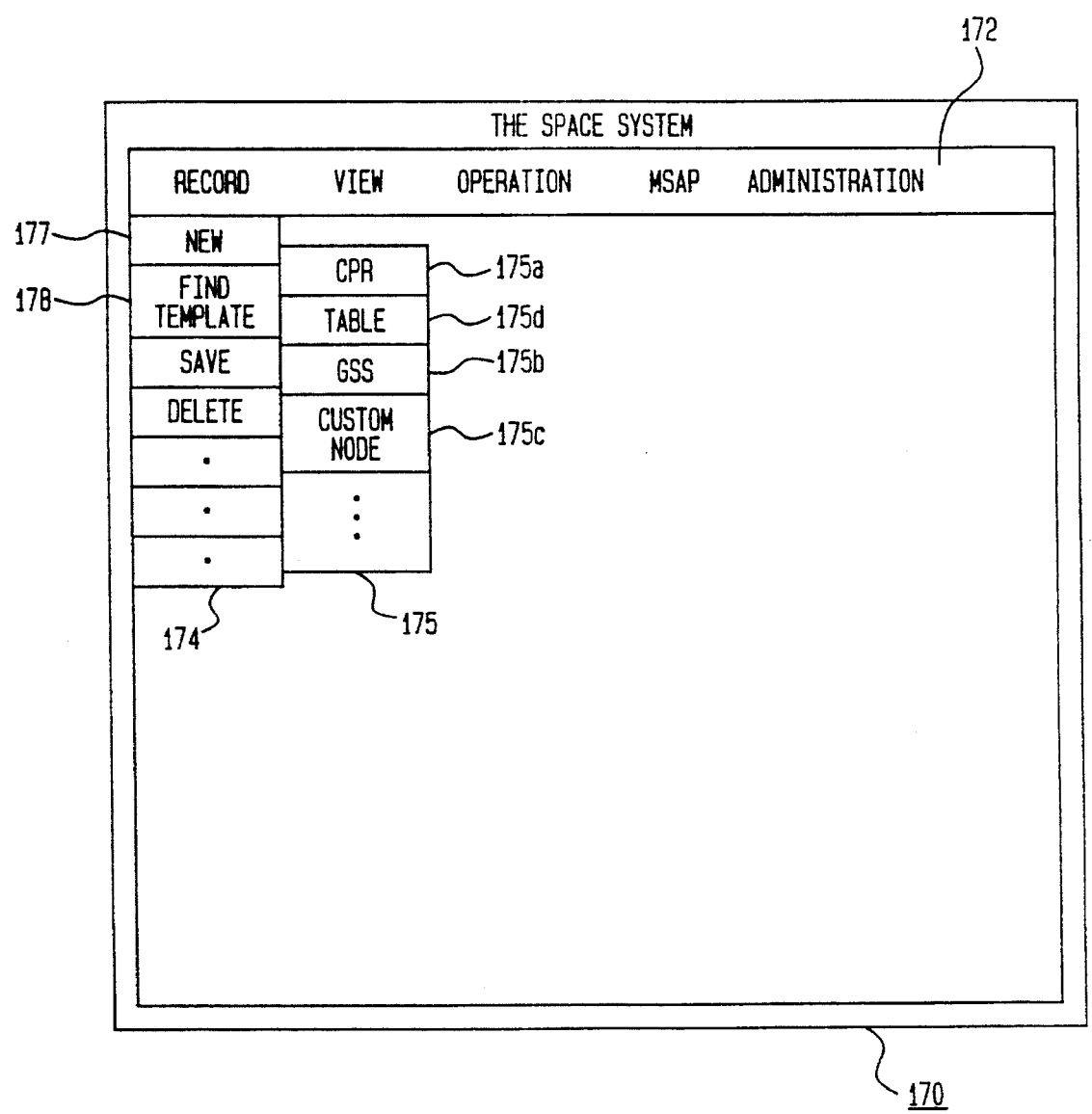
FIG. 7 illustrates a system screen in accordance with one embodiment of the present invention.

In a preferred implementation, six operations can be performed on table data: addRow, delRow, updtRow, findRow, selRow, ad nextRow. These operations are executed using menu buttons (not shown) which are displayed in a Table Editor Screen (not shown) that is displayed when a user selects the Table Suboption 175d as shown in FIG. 7. The addRow operation adds (or inserts) a set of rows into a table. The delRow operation deletes a set of rows in a table. The updtRow operation updates a set of values in a table. The findRow operation searches a table for a specified row.

The selRow operation selects a set of column values from a row of a table that matches a specified condition and returns the values from the first row found. The nextRow operation selects a set of column values from the next row of a table that match the specified condition in a previous selRow operation.

D. CPR Creation

A user creates a CPR by accessing a CPR Editor screen on display 240 of workstation 210. To call up the CPR Editor screen, a user logs onto the system (hereafter "system" is used to describe a preferred implementation of the present invention running the SPACE application) which presents a system screen 170 as shown, for example, in FIG. 7.

Figure 2B:
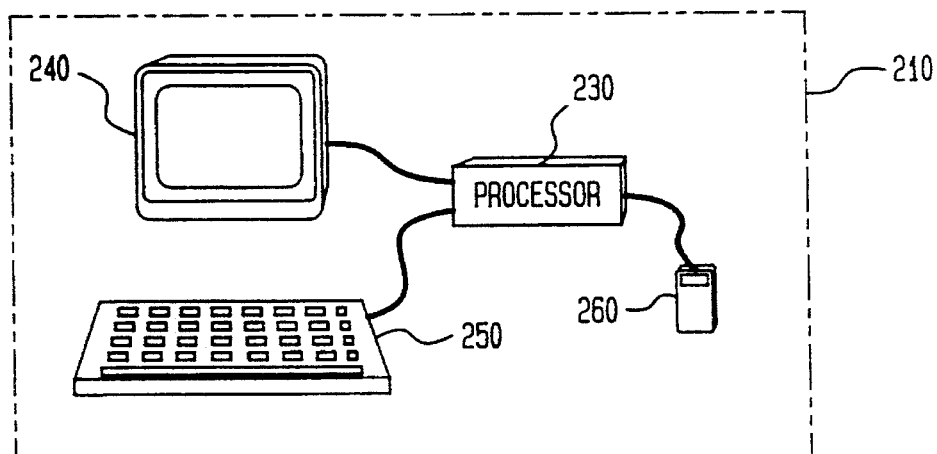
FIG. 2B is a block diagram illustrating a workstation within the service creation environment shown in FIG. 2A in accordance with one embodiment of the present invention.

The system screen 170 presents a menu line 172 having five user options: Record, View, Operations, MSAP, and Administration. The user selects an option using either the keyboard 250 or mouse 260 (FIG. 2B). This selection prompts the display of additional options. As shown, for example, in FIG. 7, if the user selects the "Record" option, a menu of Record options 174 is displayed. The user may then select an option from the displayed options by means of the keyboard 250 or mouse 260. The Record options menu 174 includes, for example, options to create a "New" record, "Find" an existing record, "Save" a record, or "Delete" a record. If a user selects the "New" option 177, the system displays associated options 175.

Figure 8:
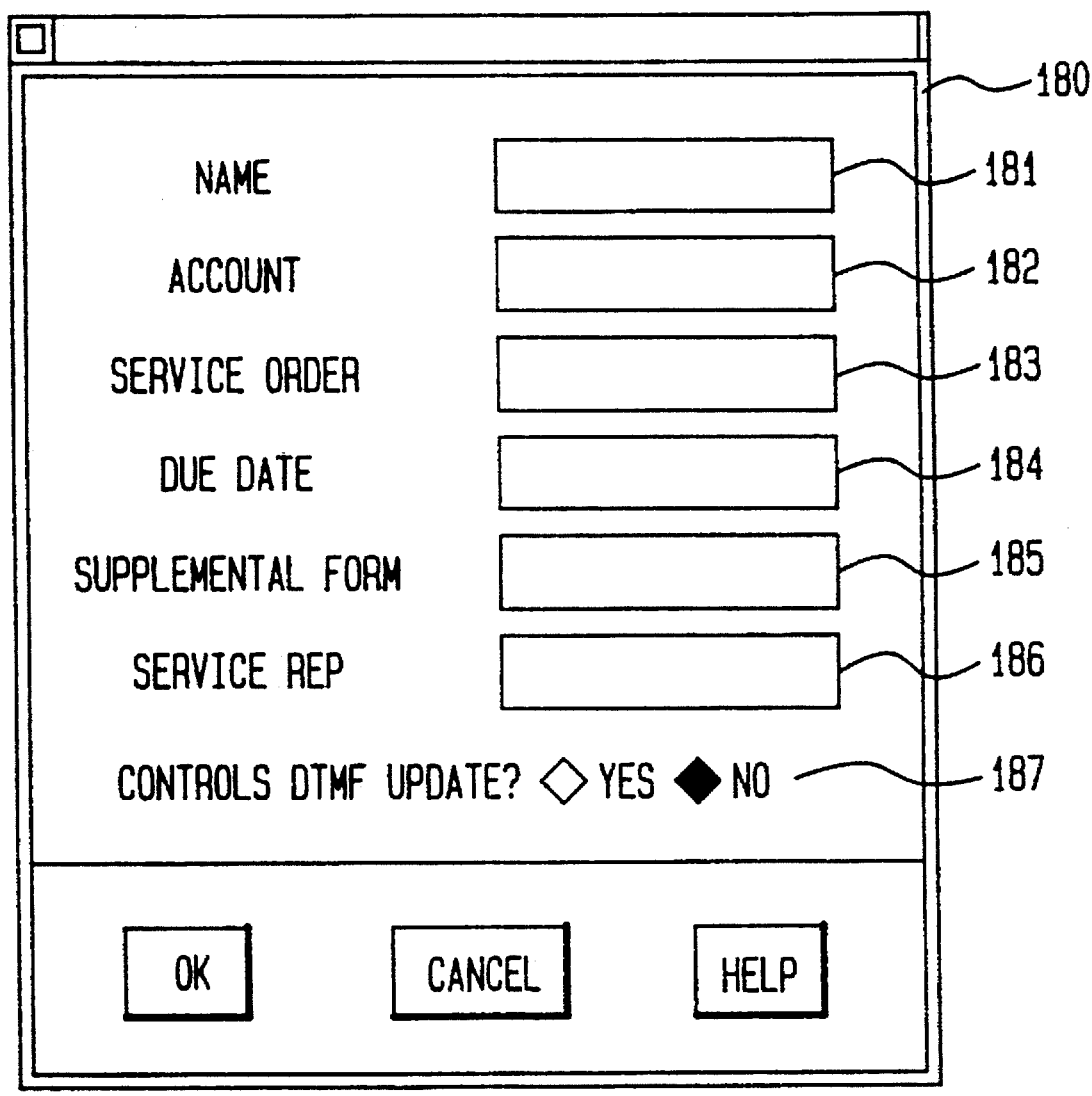
FIG. 8 illustrates a New Record Information Box in accordance with one embodiment of the present invention.

To create a new CPR and enter the CPR Editor, the user selects the CPR option 175a. This selection causes the display of a New Record Information Dialog Box, as shown for example in FIG. 8.

The New Record Information Dialog Box 180 contains five text entry fields: Name field 181, Account field 182, Service Order field 183, Due Date field 184, Supplemental Form field 185, and Service Rep field 186. Preferably, the Name field 181 may contain any user defined alphanumeric string of characters corresponding to a CPR header. The Account field 182 is optionally used to indicate a customer account for which the CPR should be associated. This allows a user to tie together a number of individual CPRs (and other records) under a single customer's account. The Service Order field 183 is optionally used to specify a service order number corresponding to the customer's request for this service. The service order number allows a user to refer to other operations systems, for example, an operations system that handles service orders. The Due Date field 184 is optionally used to indicate when the service being created must be active. The Supplemental Form field 185 is optionally used to indicate whether the service being created has additional forms in other operations systems. The Service Rep field 186 is optionally used to maintain a record of a representative who may have taken a customer's order for the service being created. The New Record Information Dialog Box 180 also includes Controls DTMF Update field 187, which is used to indicate whether the service being created will be used to control the updating of other services or tables.

Figure 9:
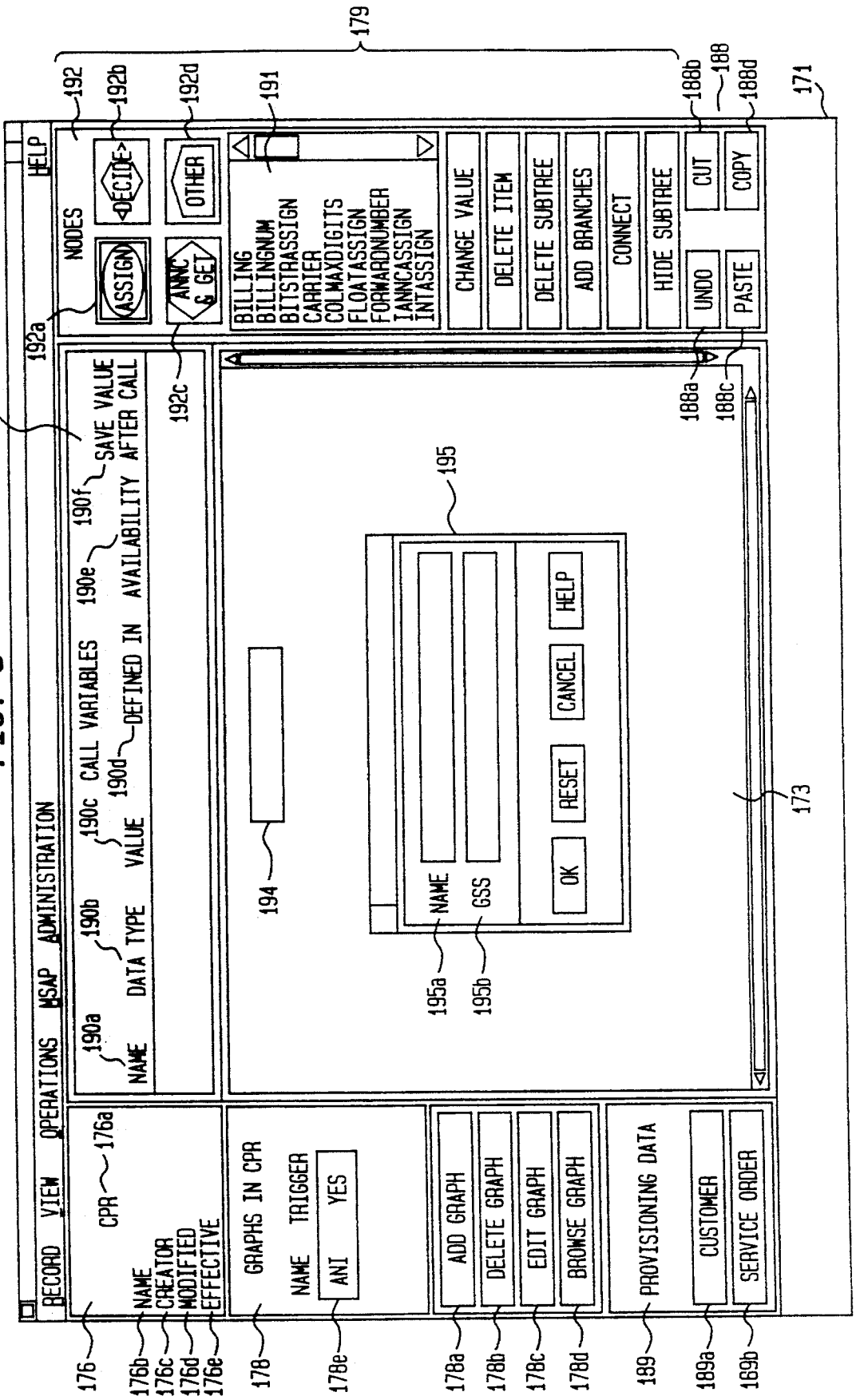
FIG. 9 illustrates a CPR Editor screen in accordance with one embodiment of the present invention.

Once the respective fields in the New Record Information Dialog Box 180 have been filled-in and checked by the user, the user selects the "OK" button, and the system presents the CPR Editor screen 171, as shown, for example, in FIG. 9.

CPR Editor Screen 171 includes a Graph Window Screen 173, a CPR Information window 176, a Graphs In CPR window 178, a Nodes window 179, a Graph Manipulator window 188, a Provisioning Data window 189, Call Variables field 190, and an Entry Point Information dialog box 195.

The user specifies an initial entry point for the CPR using the Entry Point Information dialog box 195. The Entry Point Information dialog box 195 contains two text entry fields: Name field 195a and GSS field 195b. Preferably, a user enters the name of a trigger type entry point (e.g., "ani" or "dln") or a non-trigger type entry point into the Name field 195a. The GSS field 195b is preferably prepopulated with a "generic" GSS, which is a system supplied GSS that includes every node as optional. The user can optionally specify any enabled GSS in the GSS field 195b.

As shown in FIG. 9, some of the information entered in the New Record Information Dialog Box 180 is displayed in the CPR Information window 176 on the CPR Editor screen 171 (i.e., the Type 176a and the Name 176b). The CPR Information window 176 may also include a user's identification field 176c, a modification date(s) field 176d, and an activation or effective date field 176e for the CPR.

The Graphs In CPR window 178 includes "Add Graph" button 178a, "Delete Graph" button 178b, "Edit Graph" button 178c, "Browse Graph" button 178d, and Graph List 178e.

The Call Variables window 190 includes "Name" button 190a, "Data Type" button 190b, "Value" button 190c, "Defined In" button 190d, "Availability" button 190e, and Same Value After Call button 190f.

The Nodes window 179 includes Nodes List 191, Node Type buttons 192, and Node Function buttons 193, which include a "Change Value" button 193a, "Delete Item" button 193b, "Delete Subtree" button 193c, "Add Branches" button 193d, "Connect" button 193e, and "Hide Subtree" button 193f.

The Graph Manipulation window 188 includes Undo button 188a, Cut button 188b, Paste button 188c, and Copy button 188d.

The Provisioning Data window 189 includes Customer button 189a and Service Order button 189b.

The Graph window 173 also includes a root node 194 which displays the Name (or Key) entered in the Name Field 181 of the New Record Information Dialog Box 180, the "ani" trigger entered in the Name field 195a of the Entry Point Information Dialog Box 195, and the associated GSS entered in the GSS field 195b of the Entry Point Information Dialog Box 195.

In the Graph window screen 173, graph building is accomplished using Graphs In CPR window 178, Nodes window 179, and Call Variables window 190. As described above, CPRs may have one or more entry points; hence, one or more graphs. The Graphs In CPR window allows a user to "Add" a new graph to the CPR, "Delete" an existing graph, "Edit" an existing graph, or "Browse" (view without editing) an existing graph. The name of each entry point in the CPR, as well as an indication whether the entry point is a "trigger" entry point, is displayed in Graph List 178e.

A user creates (and similarly edits) a graph by selecting nodes and logically arranging the selected nodes to form a graph. To select a node, a user first selects the type of node to be added using node type buttons 192. In one embodiment, a set of available nodes is divided into "Assignment" nodes (button 192a), "Decision" nodes (button 192b), "Play Announcement and Get Digits (PAGD) nodes" (button 192c), and "Other" nodes (button 192d). Assignment and Decision nodes are described below in Section F. PAGD nodes do just what their name suggests; during call processing, they play an announcement to the caller, prompting the caller to input information, and collect the information. Based on the node type button 192 selected by the user, the system displays the available node choices corresponding to that node type in Nodes List window 191.

The nodes of a graph are arranged in the Graph window 173 using the node function buttons presented in Node Function window 193. Preferable function buttons include "Change Value" button 193a for changing the value of a node, "Delete Item" 193b for deleting a node or branch from a graph, "Delete Subtree" button 193c for deleting a portion (subtree) of a graph, "Add Branches" button 193d for adding branches to a node, "Connect" button 193e for logically relating two nodes in a graph, and "Hide Subtree" button 193f for removing a graph portion from the CPR Editor screen in order to facilitate graph creation or editing.

The nodes of a graph are manipulated in the Graph window 173 using the graph function buttons presented in the Graph Manipulation window 188. Preferable function buttons include "Undo" button 188a for successively undoing graph actions, "Cut" button 188b for removing a subtree from a graph and placing it in an internal buffer, "Copy" button 188d for copying a subtree from a graph and placing in an internal buffer, and "Paste" button 188c for copying a subtree from the internal buffer and placing it in a graph.

Call variables of nodes in a graph are preferably defined using the Call Variables window 190. A user assigns a name to each call variable at "Name" field 190a, the data type of a call variable at the "Data type" field 190b, and the "Value" of a call variable at Value field 190c. The CALL VARIABLE window 190 also includes "Defined In" field 190d to identify the CPR, graph, or node in which the call variable is defined. The "Availability" field 190e defines the scope of the call variable, and the "Same Value After Call" field 190f indicates whether the CV is persistent.

A user can view and modify certain customer account information using the buttons presented in Provisioning Data window 189. Preferable buttons include "Customer" 189a which allows the user to view the customer account record that was specified in the Account field 182 of the New Record Information Dialog Box 180, and "Service Order" 189b which allow the user to view and/or edit the service order information that was entered in the Service Order field 183, Due Date field 184, Supplemental Form field 185, and Service Rep field 186 of the New Record Information Dialog Box 180.

E. General Service Specifications

A General Service Specification (GSS) is a specification for a particular "generic" service which may be created in numerous specific forms to tailor the generic service to a particular customer's needs. For example, many residential telephone customers may wish to prevent "900" calls from being made from their home phones. A "900 Block" service would thus be generally offered to residential customers. However, customers may desire variations in the 900 Block service they receive, thus making some "900 Block" services slightly different from others. Additionally, a service provider may desire certain functionality to monitor or control the use of the "900 Block" service by its customers. Thus, the service provider may desire to specify certain permissible functions which may be included in each customer's "900 Block" service, certain mandatory functions which must be included in each customer's "900 Block" service, and certain restricted functions which cannot be included in a customer's "900 Block" service. The GSS permits the service provider to specify these limitations and requirements for services. It can also be a useful tool for billing and generating service-specific validation nodes.

A GSS contains information that specifies and describes a generic customer service.

1. GSS Creation

To create a GSS, a user accesses the system screen 170 and selects the "Record" option from menu line 172. When the Record option menu 174 is presented, the user selects the "New" option, and the "New" option suboptions window 175 is displayed. The user then selects the "GSS" suboption 175b. Upon selecting the GSS suboption 175b, a dialog box (not shown) is presented to the user. The dialog box simply requests the user to input a name for the GSS.

Figure 10:
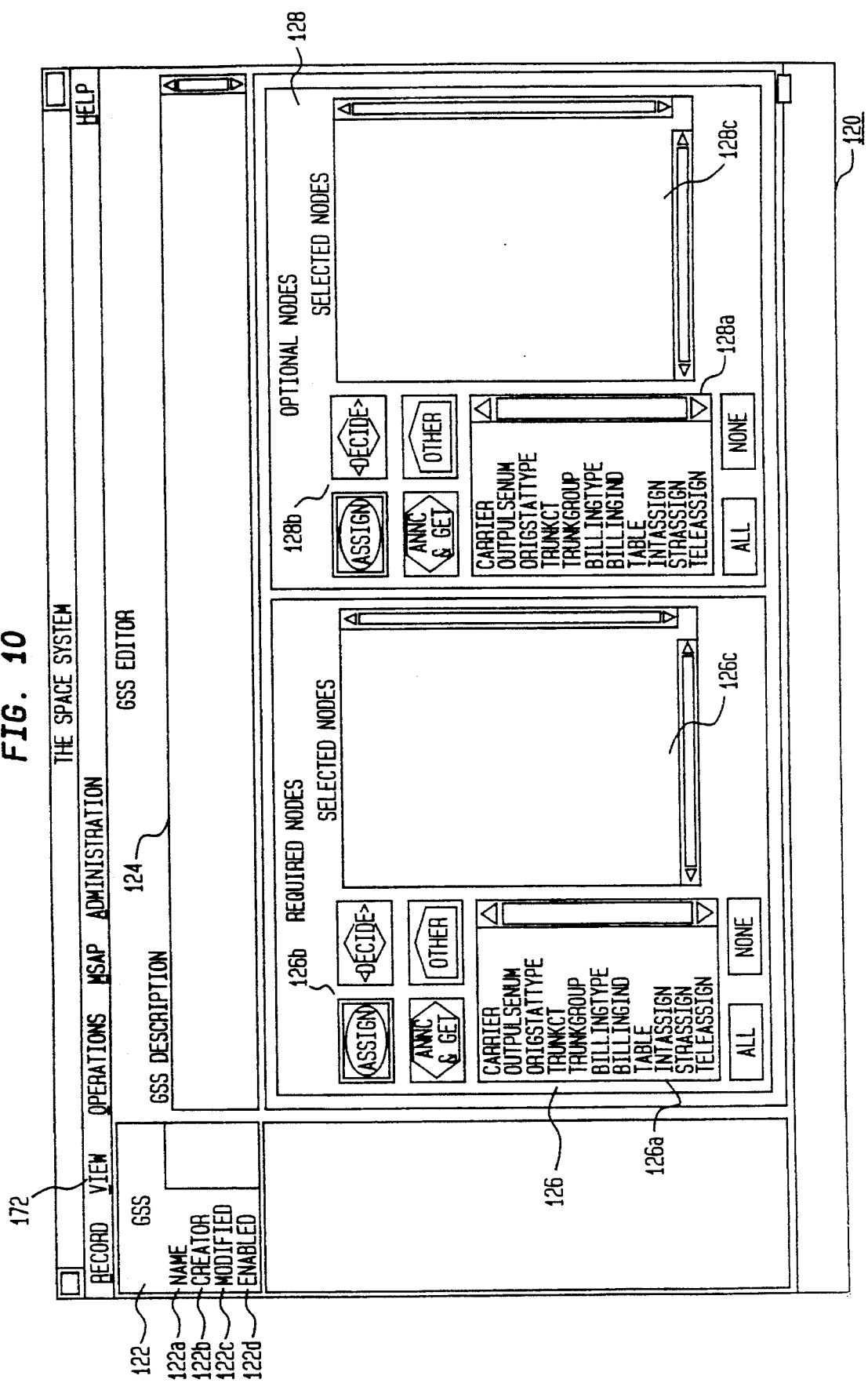
FIG. 10 illustrates a GSS Editor screen in accordance with one embodiment of the present invention.

After the user inputs a name, the system presents the GSS editor screen 120, as shown, for example, in FIG. 10.

The GSS editor screen 120 preferably includes four sections: GSS Information window 122, GSS Description window 124, Required Nodes window 126, and Optional Nodes window 128. The GSS Information window 122 includes a Name field 122a for the name of the GSS entered by the user, a Creator field 122b for the name of the creator of the GSS, a Modified field 122c for dates on which the GSS has been modified, and an Enable field 122d for a date on which the GSS was enabled.

The GSS Description window 124 is used to enter information regarding the customer service related to the GSS. For instance, the GSS description might contain a detailed description of the service to which the GSS is related or an explanation of the reasons why certain nodes are required, optional, or prohibited within CPRs associated with the GSS. For the "900 Block" service described above, a user may provide the following description: "900 Block is a service directed to residential customers who wish to prevent calls beginning with a 900 area code from their home phones."

A user defines which functions are mandatory or optional within each CPR associated with the GSS by identifying (or listing) required nodes and optional nodes for the GSS in the Required Nodes window 126 and the Optional Node window 128, respectively. Preferably, the Required Nodes window 126 includes a nodes palette 126a, node type buttons 126b, and a selected nodes window 126c. As with the nodes window 179 shown in FIG. 9, to identify required nodes, a user selects the type of node desired using node type buttons 126b. Each available node for that node type is listed in nodes palette 126a. The nodes presented in the required nodes palette 126a may be the same as the nodes appearing in the Nodes List 191 of the CPR Editor's Nodes window 179 (FIG. 9). The selected required nodes are listed in the required nodes section 126c. Each node listed in the required nodes section 126c must be used at least one time in the creation of any CPR associated with the GSS.

The optional nodes list is similarly established using the Optional Nodes window 128 which includes a nodes palette 128a, node type buttons 128b, and a selected nodes section 128c. The optional nodes list indicates which nodes may optionally be used in a CPR associated with the GSS. Any nodes not listed in either the required or optional nodes lists cannot be used in the creation of CPRs associated with the GSS being created.

In an alternative embodiment, the GSS Editor screen 120 further includes a Restricted Nodes window (not shown), which is similar to Required Nodes window 126 and Optional Nodes window 128, but wherein a user specifies nodes which cannot be used in a CPR associated with the GSS.

Once a user is satisfied that the required nodes list, optional nodes list, and restricted nodes list accurately reflect the requirements and limitations necessary to "specify" the service related to the GSS, the user saves the GSS in the database 203. To save the GSS (or any other record), the user selects the "Record" option from the menu line 172. (As shown in FIGS. 9 and 10, the menu line 172 appears on the CPR Editor screen 171 and the GSS Editor screen 120.) Once the Record option menu 174 (FIG. 7) is presented, the user selects the "Save" option and the contents of the GSS are stored in the database 203.

Before a subsequent CPR may be associated with the GSS, the GSS must be enabled. To enable a GSS, a user selects the "Operation" option from the first menu line 172 and selects an "Enable" option (not shown) from the Operations options menu (not shown). Preferably, an enabled GSS may not be edited or deleted if other records depend on it, since changes to an enabled GSS could affect records previously associated therewith.

Figure 11:
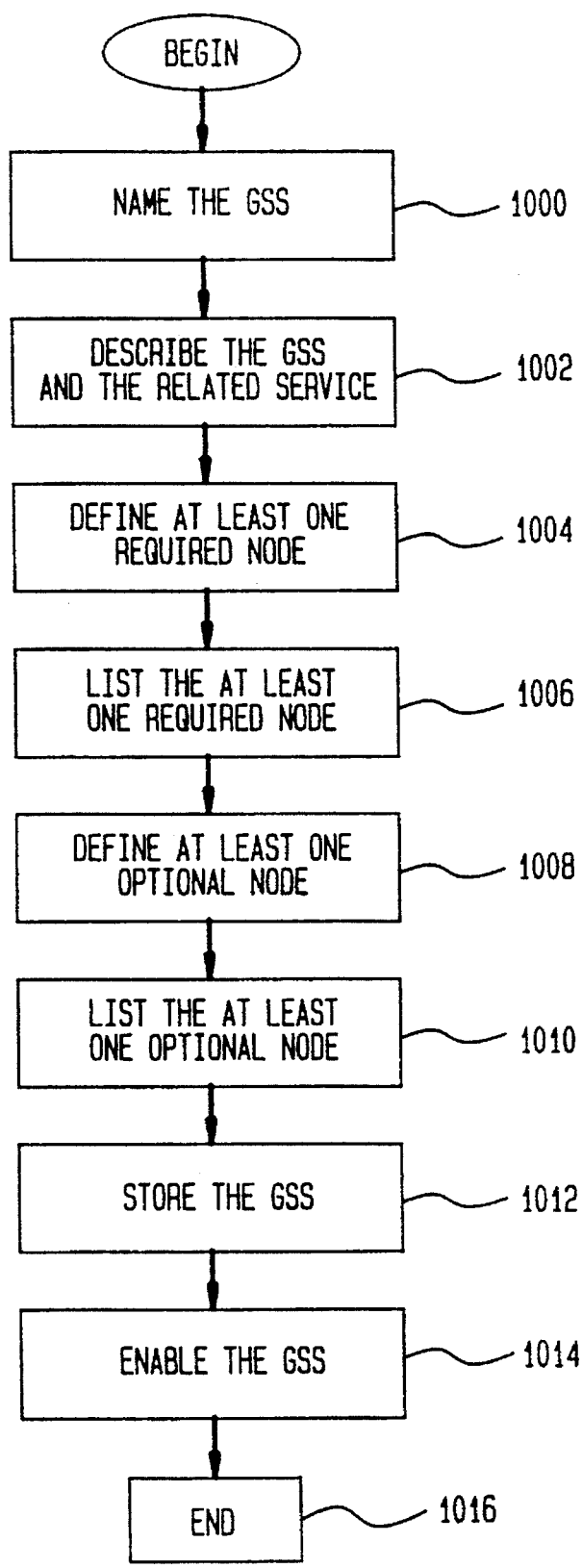
FIG. 11 is a flow diagram illustrating a GSS creation operation in accordance with one embodiment of the present invention.

The foregoing description of a method for creating a GSS is summarized in the flowchart shown in FIG. 11. In FIG. 11, a user begins by naming the GSS (step 1000) and describing the GSS and the related service (step 1002). Next, the user defines at least one required node (step 1004), lists the at least one required node (step 1006), defines at least one optional node (step 1008), and lists the at least one optional node (step 1010). Finally, the user stores the GSS in the database (step 1012), enables the GSS (step 1014), and the creation procedure ends (step 1016). In an alternative embodiment, the step of defining at least one restricted node (not shown) would be added. In an alternative embodiment, the user may specify that the GSS has zero or more optional, required, or restricted nodes.

In like manner as described above, a GSS may be created for a template.

2. Validating a CPR in Accordance with an Associated GSS

In accordance with the embodiment of the invention, during a validation process, a graph is examined to determine whether the graph is consistent with the requirements of the associated GSS. If the CPR contains restricted nodes, which are not permitted by the GSS, or does not include the mandatory nodes, the CPR fails the validation process.

FIG. 12 is an example of a GSS Editor screen 120 containing a definition of a GSS named "800basic" for a service that designates a particular long distance carrier for "800" calls made to the customer between 8:00 a.m. and 5:00 p.m. The 800basic GSS may be compared to another, more complex GSS named "800enhanced" (not shown) which might provide a greater range of potential features (at increased cost) such as, for example, Personal-Identification-Number (PIN) validation and call sampling.

In FIG. 12, the GSS description for the 800basic GSS describes some distinctions between the 800basic service and 800enhanced service. As shown in the Selected Nodes window 126c for the required nodes, the 800basic GSS requires a "Carrier" node which identifies the desired long distance carrier, and a "RouteTo" node which identifies the actual telephone number to which the "800" call should be routed. As shown in the Selected Nodes window 128c for the optional nodes, the optional nodes for the 800basic include the "Day" and "Time" nodes.

Figure 13A:
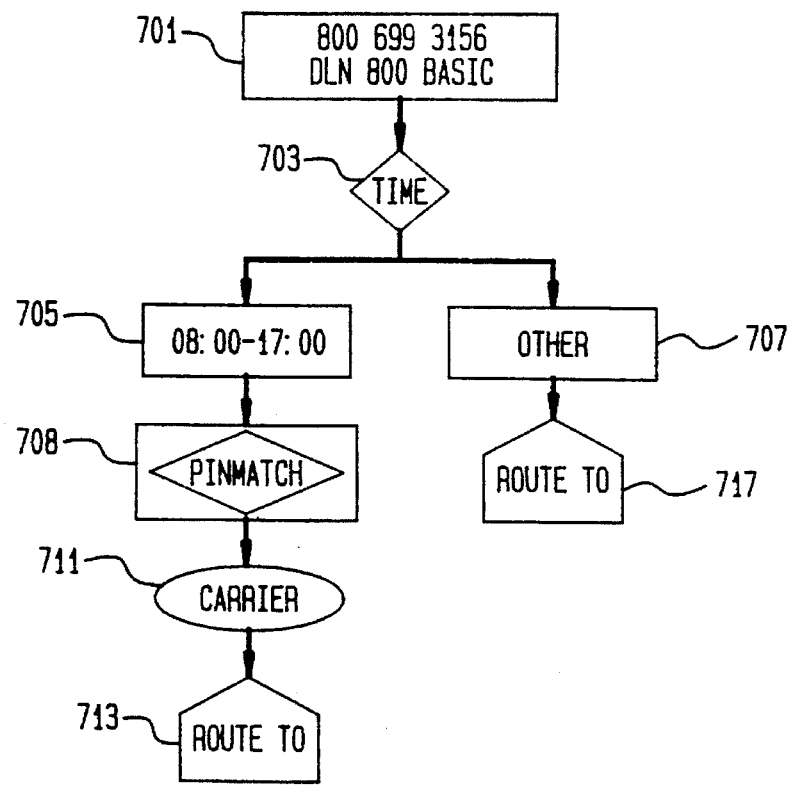
FIG. 13A illustrates an example of a graph in accordance with one embodiment of the present invention.
Figure 13B:
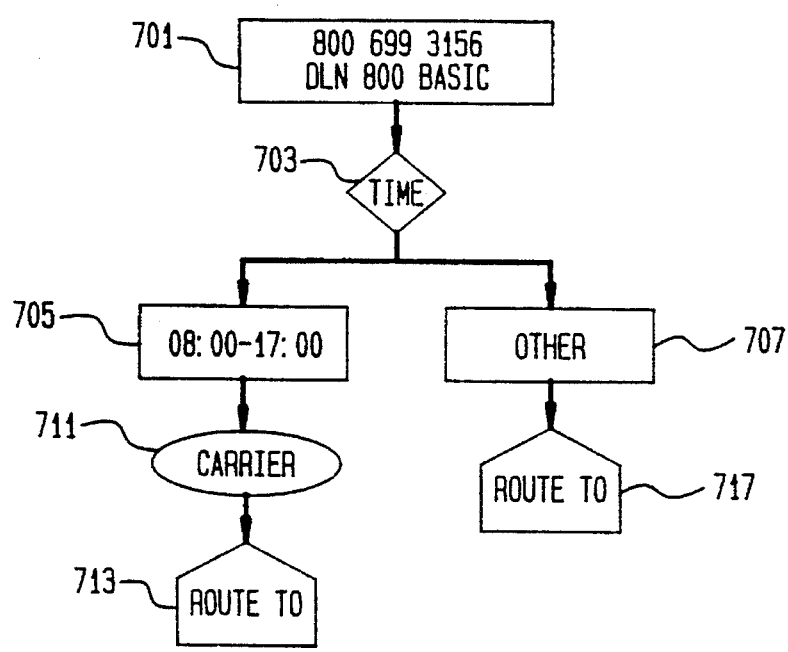
FIG. 13B illustrates another example of a graph in accordance with one embodiment of the present invention.

Assume for sake of example, that having established the foregoing GSS, a user is attempting to create a graph according to the GSS. FIG. 13A illustrates a portion of such a graph. In FIG. 13A, dialed number "8006993156" (header 701) will be routed according to a decision as to the time of day (node 703). If the time is between 08:00 and 17:00 hours (branch 705), the user wishes to validate a PIN (node 708), select a carrier (node 711), and route the call according to routing node 713. If the time is other than above (branch 707), the user wishes to route the call according to routing node 717. However, because the 800basic service does not allow PIN validation, the PINmatch node 708 must be removed from the graph. This error would be identified to the user during a validation process. A user could then edit the graph to conform to the specified parameters of the 800basic GSS. For example, a graph acceptable under the 800basic GSS is shown in FIG. 13B. The graph in FIG. 13B is the same as the graph in FIG. 13A except for the omission of PINmatch node 708. Note that the graphs of FIGS. 13A and 13B include the required "Carrier" and "Route To" nodes.

Figure 14:
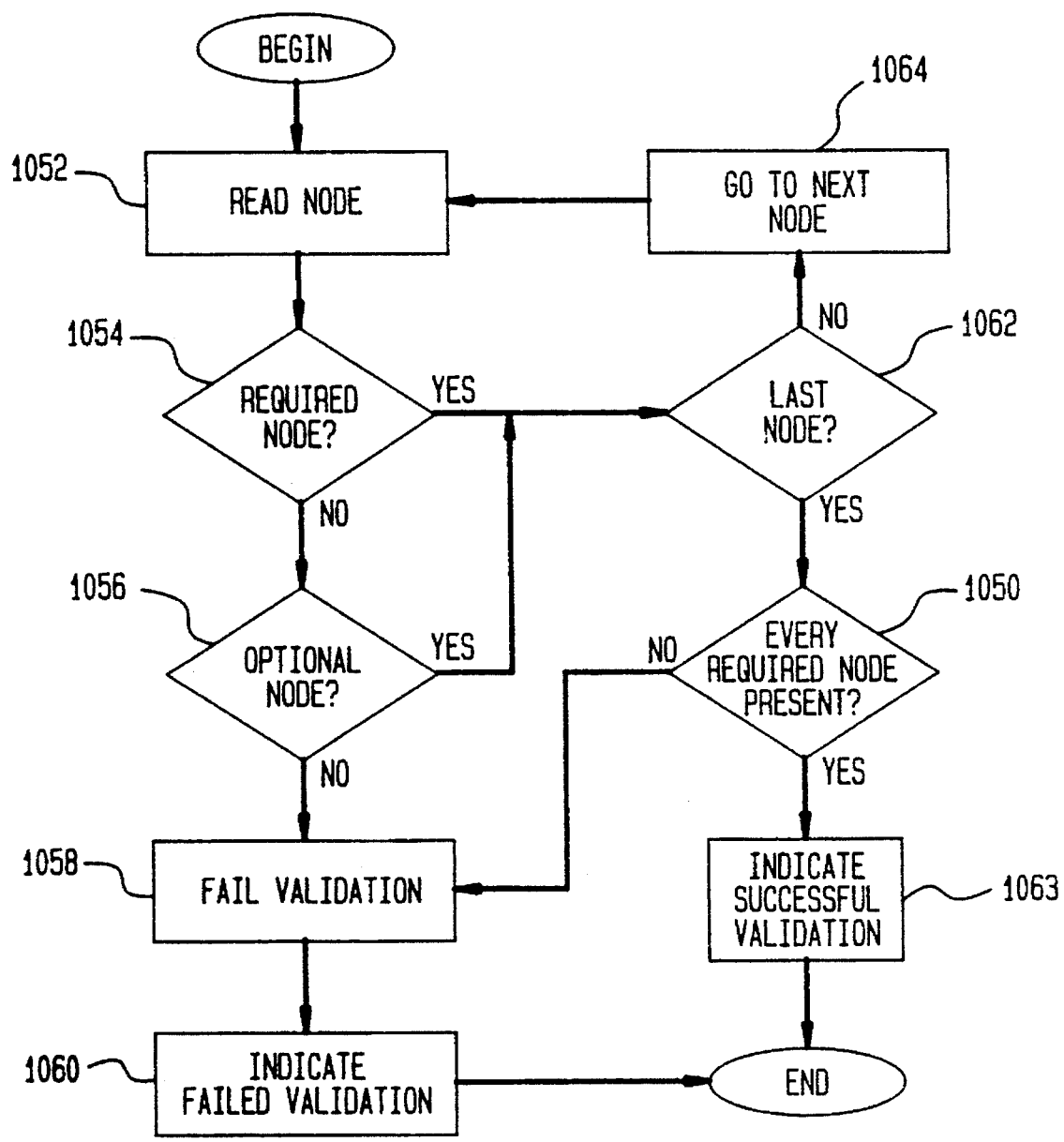
FIG. 14 is a flow diagram illustrating an operation for validating a graph against an associated GSS in accordance with one embodiment of the present invention.

A preferred method by which the present invention validates a CPR graph against its associated GSS is shown, for example, in FIG. 14. In FIG. 14, the system reads the first node in the graph (step 1052) and determines whether the node is a required node (step 1054). If the node is a required node, the system determines whether the node is the last node in the graph (step 1062). If the node is not the last node in the graph, the system goes to the next node in the graph (step 1064) and repeats the procedure. However, if the first node is not a required node, the system determines whether the node is an optional node (step 1056).

If the node is an optional node, the system repeats steps 1062 and 1064. If the node is not an optional node, the node violates the GSS and fails validation (step 1058). This failed validation is displayed to the user (step 1060).

After the final node in a graph is determined (step 1062), the system determines whether every required node of the GSS is present in the graph (step 1050). If not, the graph fails validation. If, however, every required node of the GSS is present in the graph, the system indicates a successful validation to the user (step 1063).

F. Nodes

As discussed in the set of incorporated patent applications, nodes are the basic units that define the logical operations to be performed during call processing. Each node is therefore a separate call processing procedure or a subprocedure of a graph. Nodes are logically connected to form a directed graph.

1. Action Nodes

Action nodes may be categorized as Assignment nodes, Network Action nodes, and Control nodes.

Assignment nodes are nodes which provide a function that sets a designated call variable to a particular value. The value may be a constant, another call variable, or the result of a predefined manipulator. Each Assignment node includes a call variable to be assigned a value and an expression.

For example, one example of an Assignment node is a "CARRIER" node. The CARRIER node includes a call variable "RPCARRIER" and an expression. Call variable RPCARRIER is predefined to be a "carrier" data type. For purposes of this example, the RPCARRIER CV may be assigned one value from a set of values including AT&T, MCI, or SPRINT. Accordingly, during creation of a graph containing the CARRIER Assignment node, a user must specify (or assign to) call variable RPCARRIER one of the values defined within the carrier data type (i.e., ATT, MCI, or SPRINT).

Preferably, Assignment nodes include billing nodes. Billing nodes are of particular importance because service providers must bill customers for the type and quantity of services used by the customer. Accordingly, billing nodes are often one of the required nodes in GSSs. Billing nodes preferably include a BillingInd node, BillingNum node, and BillingType node.

The BillingInd node allows a user to assign a value to one or more predefined "billing indicator" call variables. For example, a billing indicator call variable named RPBILL, may be assigned a 4-digit customer number (i.e., Mr. Jones may be customer 2045) and have a corresponding expression. Thus, a graph having the foregoing BillingInd node allows a user to define "RPBILL = 2045." With this assignment, services provided by the CPR having the graph containing the foregoing BillingInd node will be billed to customer 2045 (Mr. Jones') account.

The BillingNum node allows a user to assign a value to a call variable corresponding to a "billing number," such as a telephone number. For example, the billing number call variable may be named "RPBILLNBR," (i.e. Mr. Jones' telephone number may be 703-308-5555), may be of "telephone number" data type, and may have a corresponding expression. Thus, a graph having the foregoing BillingNum node allows a user to assign "RPBILLNBR = 7033085555." With this assignment, services provided by the CPR having the graph containing the foregoing billingNum node will be billed to telephone number 703-308-5555.

The BillingType node allows a user to assign a value to one or more predefined "billing type" call variables. For example, a billing type call variable may be named RPMONTHLY, may be of signed integer data type, and may have a corresponding expression. Thus, a graph having the foregoing BillingType node allows a user to assign "RPMONTHLY = 15."With this assignment, services provided by the CPR having the graph containing the foregoing BillingType node will be calculated and billed on the fifteenth day of every month.

Control Nodes allow multiple CPR entry points to be traversed as part of a single call execution and include a Handover node and Transfer Control node. The Handover node allows a CPR to call and execute another graph before continuing with the current CPR graph. The graph may be located in another CPR, thus the Handover node requires that the CPR key, trigger, and entry point for the graph be specified within the Handover node. Once the other graph is processed, processing returns to the original CPR graph.

The Transfer Control node is like the Handover node in that another CPR is specified and executed. Unlike the Handover node, however, the processing does not return to the original graph, but remains at the transferred CPR.

2. Decision Nodes

Decision nodes are used to branch execution through the graph. Decisions as to which graph branch to traverse may be made on the basis of a call variable value and an expression within the decision node. For example, a Call Variable Decision node may include a call variable named "READY" of data type Boolean. This decision node branches one way or the other in a graph based on "READY =yes," or "READY =no." Compare nodes compare expressions. For example, a compare node may compare the expressions: "$TRYS<3" to determine whether a customer has made less than three attempts to input data to the system. The compare node takes a "yes" branch if the comparison is true and takes a "no" branch if the comparison is false.

Decisions as to which graph branch to traverse may also be made on the basis of a "percent" decision. The Percent Decision node is used to randomly choose one of a number of possible graph branches. The percentage each individual branch will be traversed in the long run is specified in a Percent Decision node at the head of each branch. The sum of all branch percentages will equal 100%.

3. Administrative Nodes

Administrative nodes are used to collect service or customer traffic data which can be used by a service provider to analyze and administrate service or customer usage. Administrative Nodes preferably include Sampling nodes and Measurement nodes.

a. Sampling Nodes

Sampling nodes collect values of selected call variables during call processing execution. Sampling nodes are defined by a sampling rate, a sampling type, and a sample data name. Additionally, a sample data retention period, a collection type, and/or a list of call variables to be collected may be specified for a sampling node.

The sampling rate identifies the percentage of calls to be sampled in order to obtain the specified data. The sample type may be, for example, an "attempt" sample, which captures data when a call is attempted, or a "completion" sample, which captures data when the call is actually completed.

Figure 15:
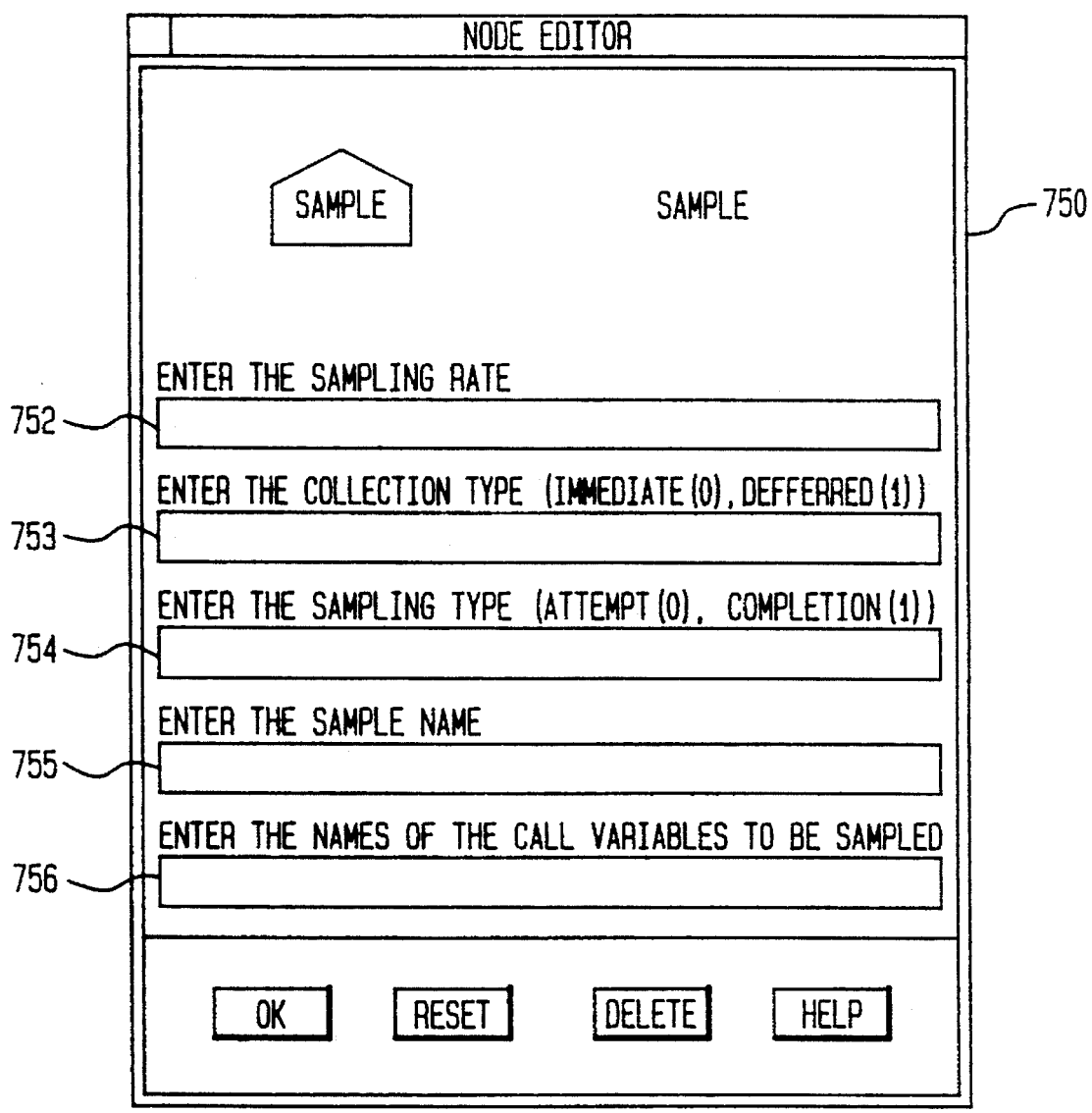
FIG. 15 illustrates a NODE Editor screen in accordance with one embodiment of the present invention.
Figure 16:
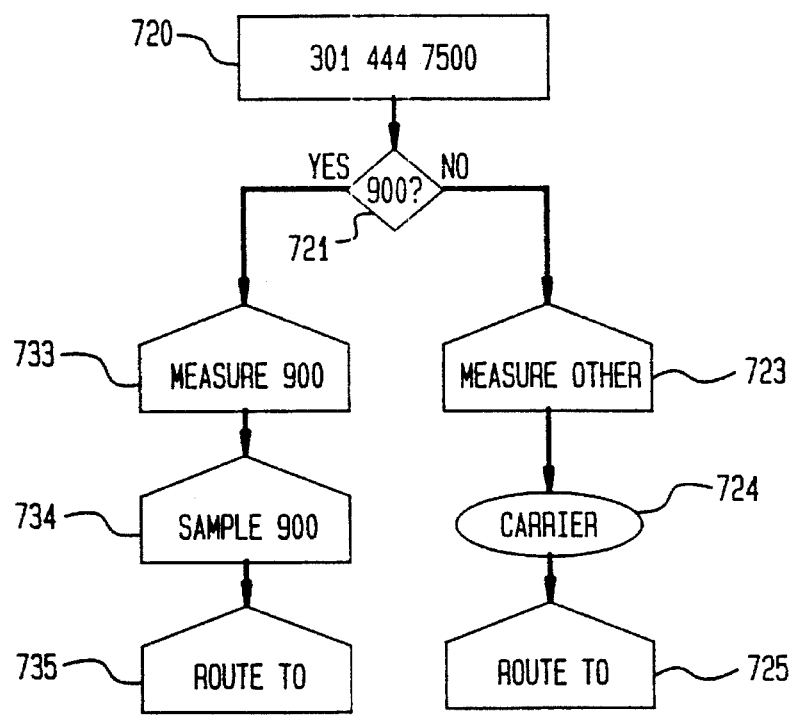
FIG. 16 illustrates an example of a graph using Measurement and Sampling nodes in accordance with one embodiment of the present invention.

To add a Sample node to a graph, a user selects the "Sample" node from the Nodes window 179 (FIG. 9). A Sample Node Editor Dialog Box 750, as shown for example in FIG. 15, is then superimposed on the CPR editor screen 170. For a sample node, the Node Editor Dialog Box 750 requests a definition of a sampling rate (0–100%) (field 752), collection type (field 753), sampling type (attempted or completed) (field 754), sample node name (field 755), and the call variable to be sampled (field 756). Once the fields are completed and the user selects the "OK" button, the Sample node is instantiated in the graph. Use of a Sampling node in a graph is illustrated in FIG. 16 and described in more detail below.

b. Measurement Nodes

Measurement nodes count events. Events may be, for example, the number of times a graph or a portion of a graph is traversed, how many times a call variable is changed, etc. Measurement nodes may count up or down from a predetermined starting number. Thus, Measurement nodes are used to update a component of a measurement vector. A measurement vector is an "up count" or a "down count."

Measurement nodes are created during graph building by specifying which component of a measurement vector call variable is to be incremented or decremented. This designation is preferably made in the Call Variable window 190 of the CPR Editor Screen 170 (FIG. 9). Alternatively, the measurement vector call variable, the measurement vector component, and the increment/decrement designation are provided in response to prompts in a measurement node Editor Dialog Box (not shown) similar to the Sample Mode Editor Dialog Box 750 shown in FIG. 15.

The system uses a unique counter created when the measurement vector was defined. The counter is loaded with the starting point value and changes the value (up or down) on the basis of subsequent measurements.

FIG. 16 shows part of a graph incorporating a Sample node and Measurement nodes. In this graph, calls originating from a customer's number "3014447500" (header 720) are routed based on a determination of the "900?" node (721). For this example, the 900? node is a User-defined node (described below) which accepts a telephone number, determines the area code of the telephone number, compares this area code to a constant call variable value of 900, and selects a graph branch on the basis of this comparison.

If the dialed telephone number does not have an area code of 900, the call is "counted" by a Measurement node named "Measureother" (node 723), assigned a carrier (node 724), and routed according to routing node 725. If, however, the dialed telephone number has a 900 area code, the call is counted by a Measurement node named "Measure900" (node 733), sampled by a Sampling node named "Sample 900," (node 734), and routed according to routing node 735.

Measureother node 723 and Measure900 node 733 each has an assigned counter which counts up from zero to measure the number of outgoing phone calls having non-900 and 900 area codes, respectively. Accordingly, the number of uses for each branch of the graph can be measured.

In the above example, the "Sample900" node 734 has been previously defined to sample a predetermined call variable. Assuming a sample rate of 20, the Sample900 node will sample the predetermined call variable once every five calls having a 900 area code.

Data measured or sampled is preferably stored in a database for review by the service provider and/or the customer.

4. Interaction Nodes

Interaction nodes preferably include two types of nodes: Network Interaction Nodes and External System Interaction Nodes.

a. Network Interaction Nodes

Network Interaction nodes preferably include a Connect node, a Terminate node, and a Play Announcement and Collect Digits Node. The Connect node allows a user to route a call to a designated number. The routing number is specified as a call in the Connect node. The Terminate node allows a user to block a call. Once a graph reaches a Terminate node, all call processing is halted. The Play Announcement and Collect Digits node, as discussed above, is used to play an announcement to the customer, and then collect digits (i.e., DTMF signals) from the user in response to the announcement.

b. External System Interaction Nodes

This node type preferably includes a GetData node, SendData node, and WaitForEvent node. The GetData node allows the user to send a message to an external system (outside the SCP) requesting certain data from that external systems data base to be placed in call variables that are specified in the node. The SendData node allows a user to send a message to an external system (outside the SCP) to store certain data as provided in call variables that are specified in the node, in the external system's data base. The WaitForEvent node allows the user to wait for the completion of an external event such as any GetData or SendData operation before call processing will continue.

Figure 17:
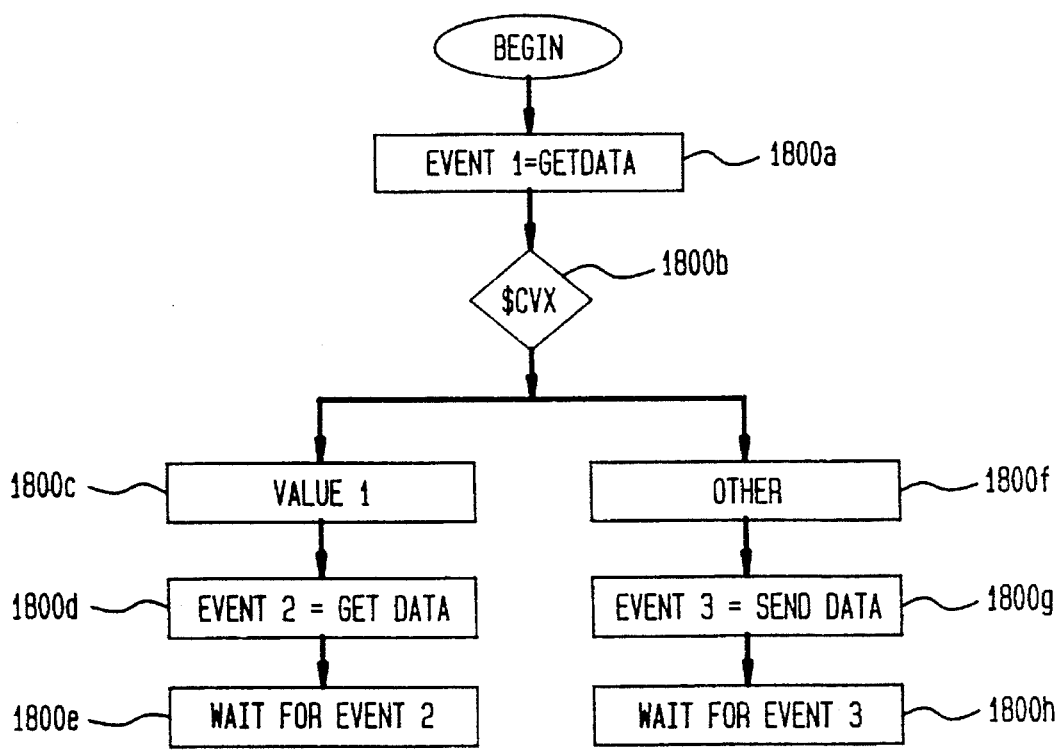
FIG. 17 illustrates an example of a graph using External System Interaction nodes in accordance with one embodiment of the present invention.

FIG. 17 illustrates a graph using GetData, SendData, and WaitForEvent nodes. In the graph of FIG. 17, GetData node 1800*a* requires the SPACE system to get a value from a different system, return it to the SPACE system and put it into a call variable entitled Event 1. Call variable decision node 1800*b* may be, for example, a day of week decision node which compares the Event 1 call variable to value 1 in decision branch 1800*c*, which may be, for example, the values equal to Monday–Friday. If the call variable in Event 1 is equal to value 1, GetData node 1800*d* requires the SCP to retrieve a value from a system outside the SCP and put it into a call variable entitled Event 2. Because the external system from which GetData node 1800*d* is retrieving a value may be located far away from the SCP or may be busy, it may require some time to return the value. Accordingly, WaitForEvent node 1800*e* tells the SCP to wait until the value is returned before further processing. If at node 1800*b* the event 1 call variable is something other than value 1, it will be processed through branch 1800*f*. SendData node 1800*g* causes the SCP to send a call variable specified in event 3 to an external system. WaitForEvent node 1800*h* awaits the completion of the SendData operation.

5. User-Defined Nodes

User-defined (or custom) nodes are single nodes having an underlying graph associated therewith. The underlying graph is defined by the user, hence the name. A displayed representation of a User-defined node will have the appearance of a single node even when that particular User-defined node contains multiple nodes.

To create a User-defined node, a user displays the system screen 170 and selects the "custom node" suboption 175*c*

Figure 18:
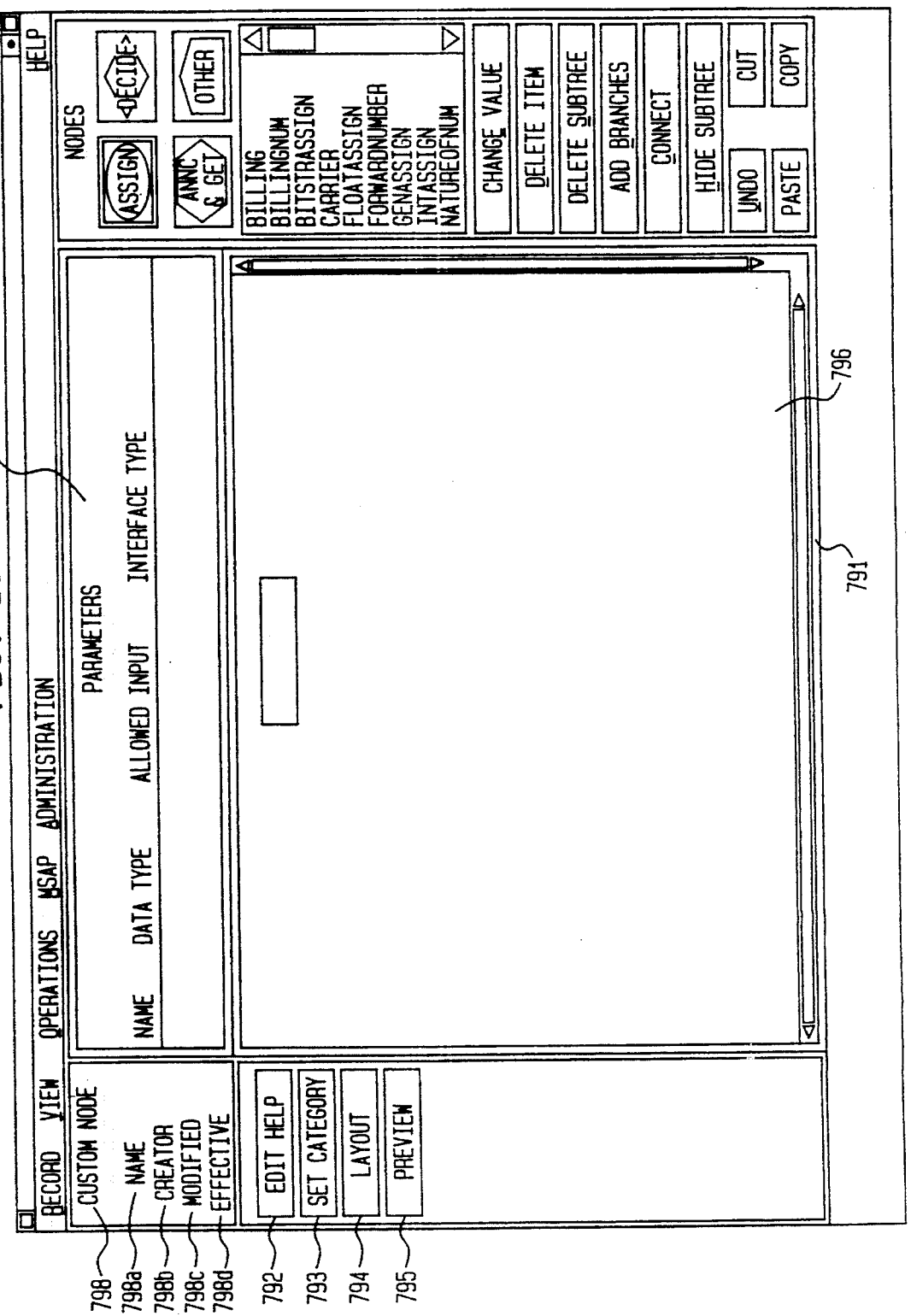
FIG. 18 illustrates a Custom Node Editor screen in accordance with one embodiment of the present invention.

(FIG. 7). The system then displays a dialog box (not shown) requesting the user to input a name for the custom node. Once the name has been entered and the user selects the "OK" button, the Custom Node Editor screen 791 is displayed, as shown in FIG. 18.

Custom Node Editor screen includes a Custom Node Information window 798, which includes "Name," "Creator," "Modified," and "Effective" fields 798a–d, similar to these same fields for the CPR and GSS Editor screens (see FIGS. 9 and 10).

The underlying graph of a custom node is built by the user in the Graph Editor portion 796 of the Custom Node Editor screen. Graph building on the Graph Editor portion 790 proceeds in a manner similar to the graph building process described with respect to the CPR Editor screen 171 in FIG. 9.

The Custom Node Editor 791 also includes parameters window 797 which displays a list of parameters associated with the custom node being generated. These parameters define the relationship of the input fields for the custom node and the values within the graph. A parameter is a variable that will be filled in by the user of the custom node when it is inserted into a graph.

Figure 19A:
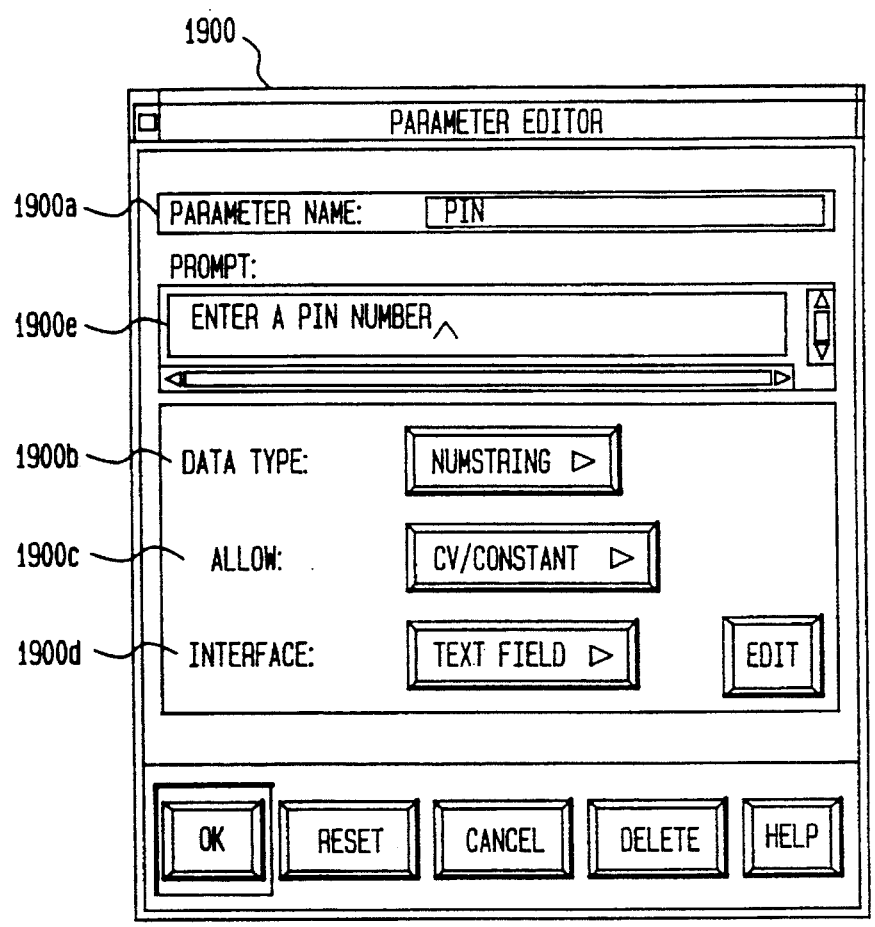
FIG. 19A illustrates Parameter Editor screen in accordance with one embodiment of the present invention.

A Parameter Editor 1900, as shown for example in FIG. 19A, is used to create and modify parameters for a custom node. The Parameter Editor 1900 is displayed by "mouse clicking" on a preselected portion of the Parameters window 797. Parameter Editor 1900 prompts the user to complete a "parameter name" field 1900a, a "data type" field 1900b, an "allow" field 1900c, and an "interface" field 1900d. The parameter name is used when referring to this parameter as part of the value of a node. The "allow" field specifies permissible values for the parameter. For example, in FIG. 19A, the "allow" field 1900c permits only constants and call variables for the "Pin" parameter.

Figure 19B:
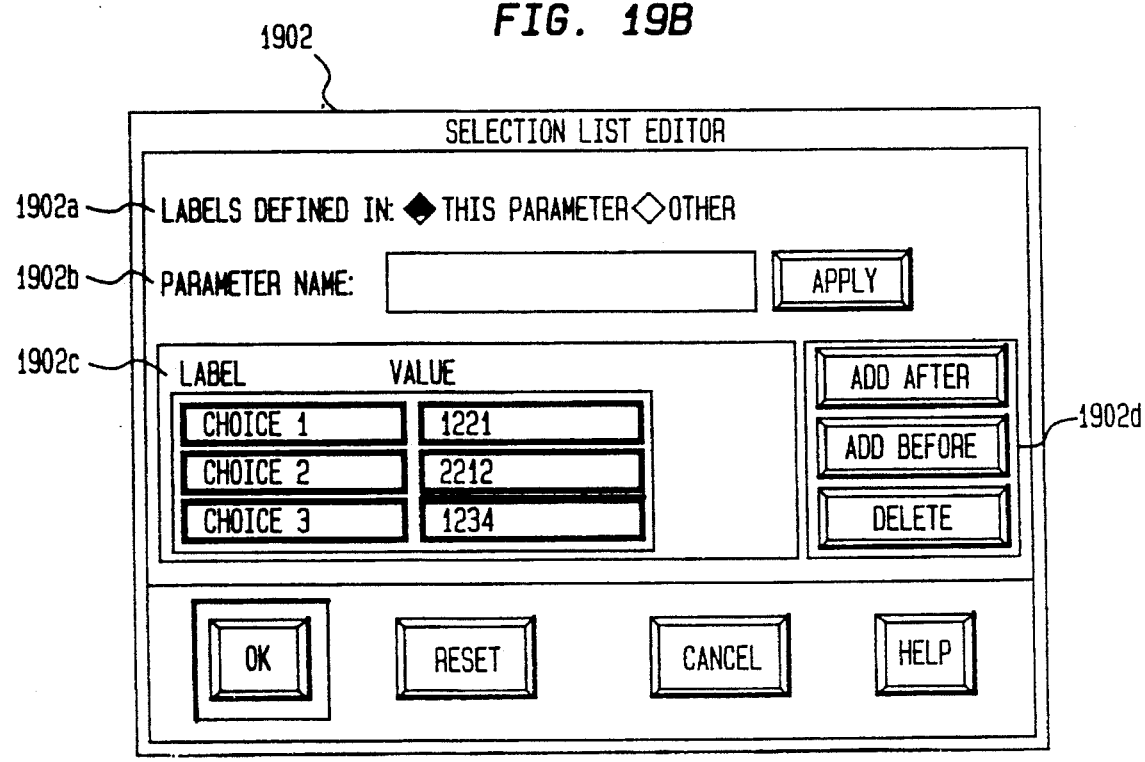
FIG. 19B illustrates a Selection List Editor screen in accordance with one embodiment of the present invention.

Using "Interface" field 1900d, the user can specify the type of interface to be displayed to a user of the customized node. Preferable interfaces include text fields, buttons, or selection lists. If a user designates the interface to be either buttons or selection lists, a Selection List Editor, as shown for example in FIG. 19B, is displayed.

The Selection List Editor 1902 allows the user to enter a list of labels which will be displayed when a custom node having the parameter being defined is used, as well as values associated with the labels.

The Selection List Editor 1902 includes a "Labels Defined In" field 1902a, a "Name" field 1902b, a "Label/Value" field 1902c, and a "Manipulators" field 1902d. Labels for a parameter may be defined in the Label/Value field 1902c or in another parameter. This allows a user to tie together the values of the parameters. Fields 1902a and 1902b permit the user to specify in which parameter the labels are defined. Label/Value field 1902c provides a list of labels that will be presented to user of the custom node. In FIG. 19B, for example, he labels for the personal identification number (PIN) are "Choice 1," "Choice 2," and "Choice 3." The actual values specified for these labels are "1221," "2212," and "1234," respectively. The labels for values provide for a more user-friendly interface. Manipulator buttons 1902d are used to manipulate labels and values in the Label/Value field 1902c.

Parameter Editor 1900 also includes Prompt field 1900e, which allows a user to designate the text of a prompt should the user select the interface to be a text field. For example, in FIG. 19A, a user has selected a text field interface and specified the text field to read "Enter a PIN number."

Returning to FIG. 18, the Custom Node Editor 791 also includes Edit Help option 792, Set Category option 793, Layout option 794, and Preview option 795, each of which allows the user to define a portion of the Custom node.

The Edit Help option 792 invokes an Edit Help Editor (not shown) which contains a written description of the custom node. Upon creation or modification of a custom node, the user may edit the written description regarding the custom node.

Figure 20:
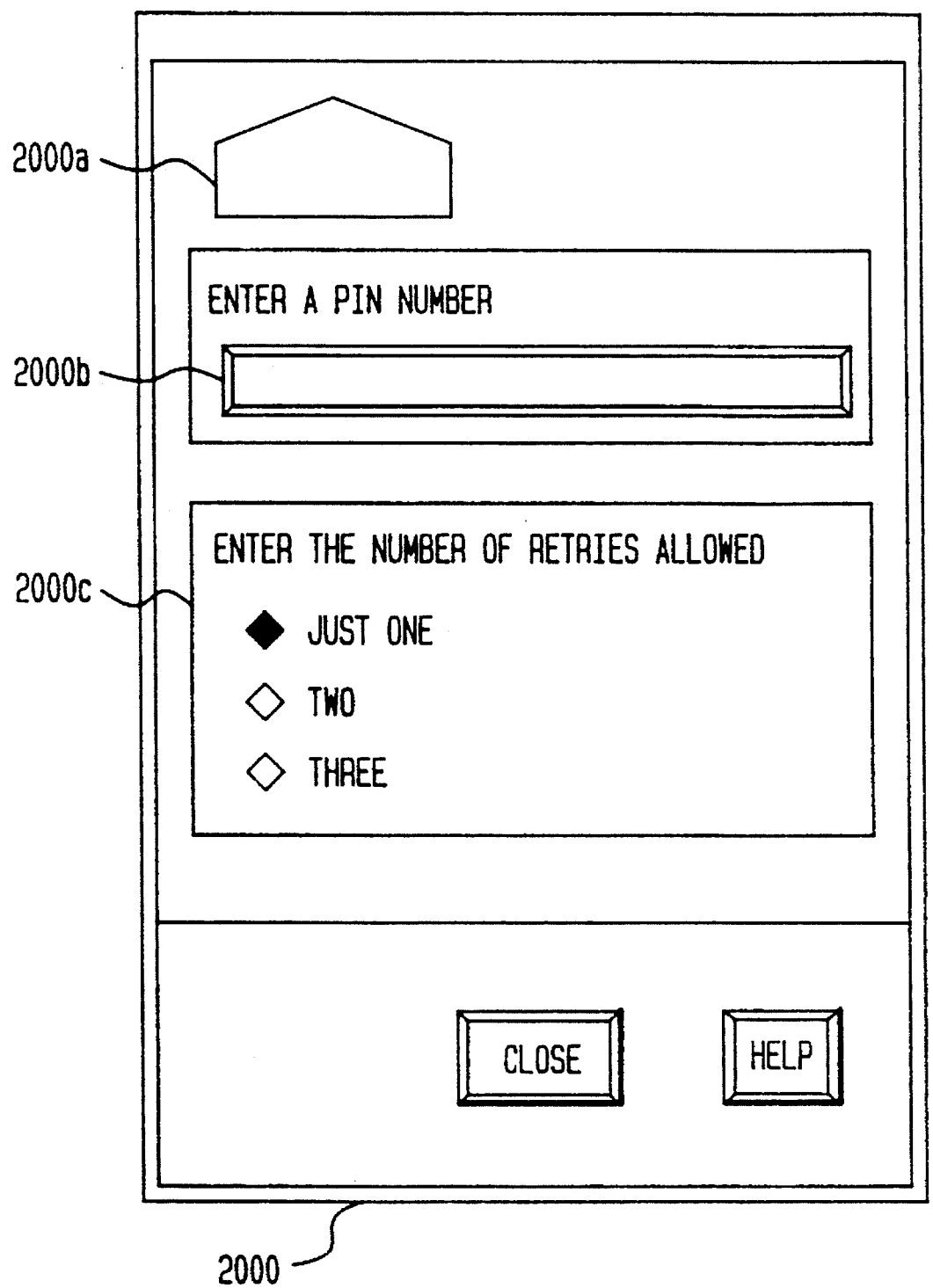
FIG. 20 illustrates a Custom Node Preview screen in accordance with one embodiment of the present invention.

The Preview option 795 displays a Preview Editor 2000, as shown for example in FIG. 20. Preview Editor 2000 includes a Name field 2000a to identify the node for which information will be requested. Field 2000b displays the user interface that was specified in the prompt field 1900e and the interface field 1900d of the Parameter Editor 1900. For PIN nodes, the system permits the user to specify the number of PIN retries that will be permitted; hence, FIG. 20 includes "retries" field 2000c.

Figure 21:
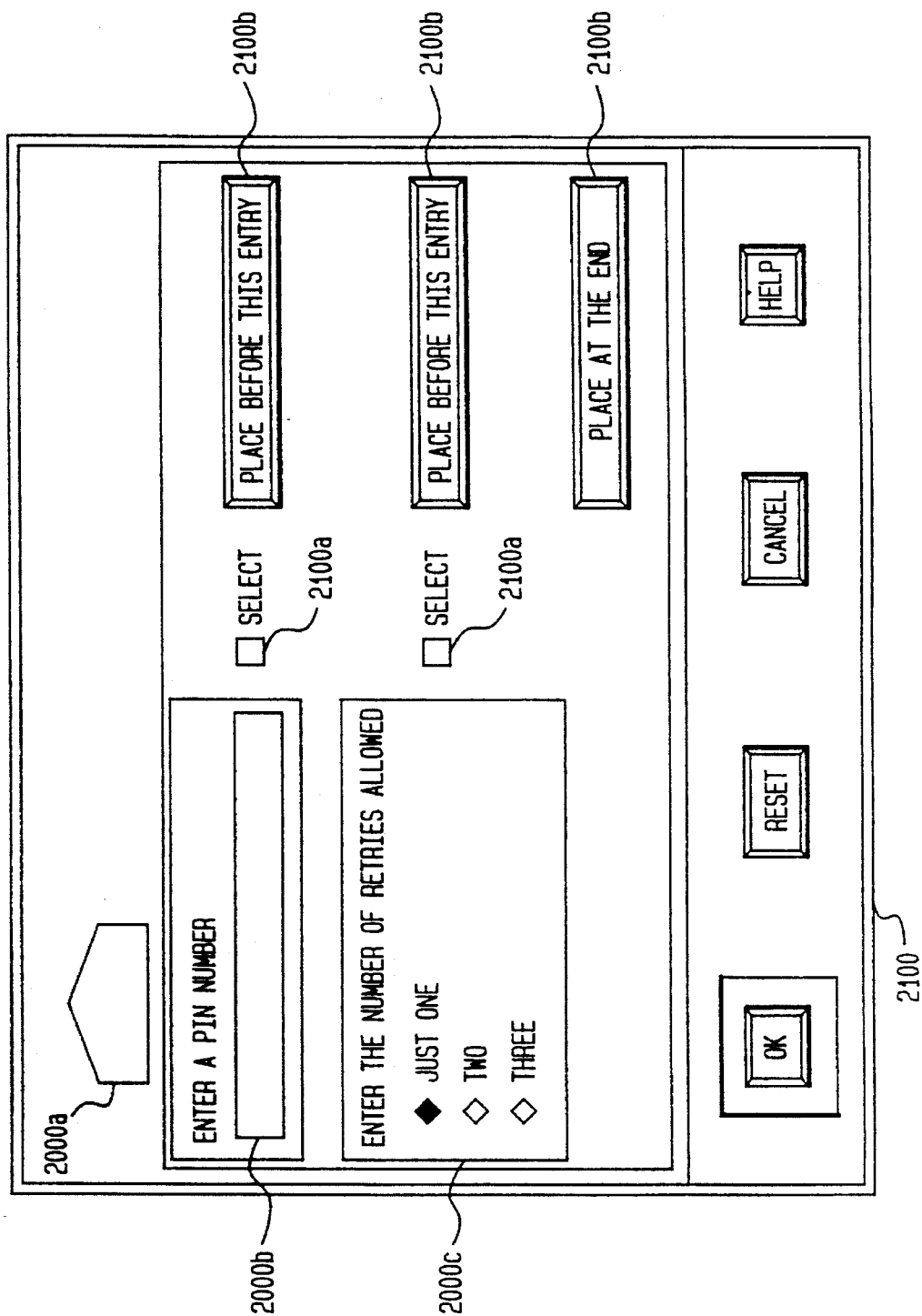
FIG. 21 illustrates a Custom Node Layout Screen in accordance with one embodiment of the present invention.

The layout of the fields presented in the Preview Editor can be changed using the Layout option 794. The Layout option 794 displays a Layout Editor 2100, as shown for example in FIG. 21. As shown, the Layout Editor 2100 includes the same fields 2000a, 2000b, and 2000c, as displayed in the Preview Editor 2000. However, in the Layout Editor 2100, these fields can be manipulated by selecting a field (using select buttons 2100a) and clicking on one of the manipulator buttons 2100b.

Figure 22:
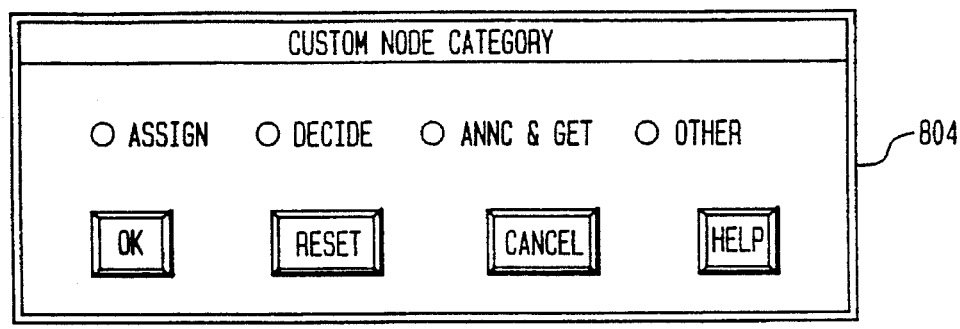
FIG. 22 illustrates a Custom Node Category screen in accordance with one embodiment of the present invention.

The Set Category option 793 is used to establish a node category type for the custom node being created when a user selects the Set Category option 793, the system displays a Custom Node Category Editor 804, as shown for example in FIG. 22. Using the Custom Node Category Editor 804, a custom node may be assigned to any of the node types represented by the node type buttons 192 (FIG. 9).

When the custom node is fully defined and categorized, the user enables the node by selecting an "Enable" suboption (not shown) from the "Operations" menu (not shown) on the System screen 170 (FIG. 7). Preferably, the underlying graph is validated prior to being enabled. Once a User-defined node has been enabled, it will appear in the nodes list 191 of the CPR Editor screen 171 and the nodes lists 126a and 128a of the GSS Editor screen 120.

When a CPR containing a custom node is trace tested, the custom node will be displayed as a single node. In other words, the underlying graph is not displayed. However, individual nodes within the underlying graph of the custom node are tested in the same manner as other nodes in the graph. Each node of the underlying graph of a custom node is also considered during validation. Thus, errors and warnings generated by a testing or validation process can be specified to a particular node within the underlying graph of the custom node.

6. Table Nodes a. Intable node

An Intable node determines whether a particular value exists in a particular table and selects between two branches of a graph depending on the determination.

Figure 23:
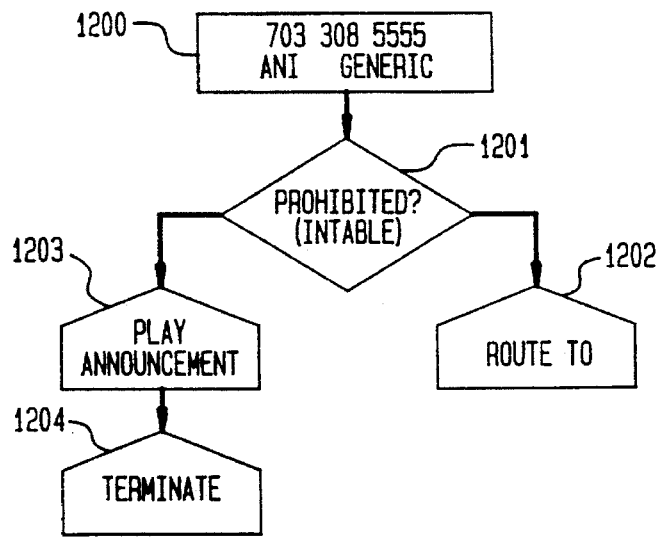
FIG. 23 illustrates an example of a graph using an Intable node in accordance with one embodiment of the present invention.

An example of a graph using an Intable node is shown in FIG. 23. In this graph, calls originating from telephone number 703-308-5555 (see header 1200) are checked by Intable node 1201 to see if the dialed number is listed in a Table of prohibited telephone numbers. For this example, Intable node 1201 is named "Prohibited." If the Prohibited node finds the dialed number in the Table, an announcement is played (node 1203) informing the caller that the dialed call cannot be completed, and the call is terminated (node 1204). However, if the dialed number is not found in the table, the call is routed according to routing node 1202.

Figure 24:
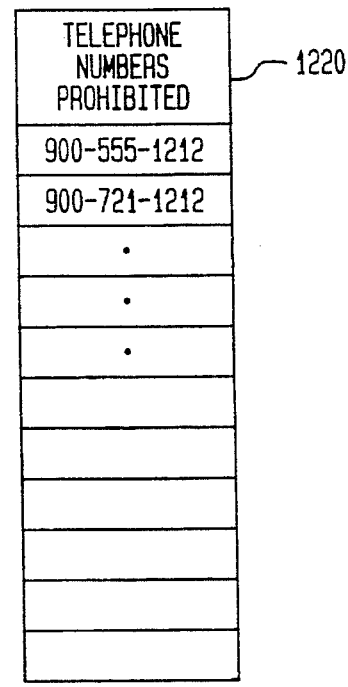
FIG. 24 illustrates a table in accordance with one embodiment of the present invention.

The table designated and searched by the "Prohibited" node might be a single column table listing all prohibited telephone numbers (1220) like the one shown, for example, in FIG. 24. Alternatively, the designated table might be a multiple column table such as that shown in FIG. 6A, in which case the Intable node which designates and searches the table must also designate the column to be searched.

The Intable node includes a search expression defining search criteria for locating a particular table row in a standalone table or a table call variable. The search criteria is a list of column value pairs. Preferable values for search columns are any valid column names within the specified Table. Preferable values for the search value are any valid values for the search column (e.g., a string if the search column contains string data type information) or the name of a call variable (preceded by a dollar sign) whose value is of the same data type as the search column.

Figure 25:
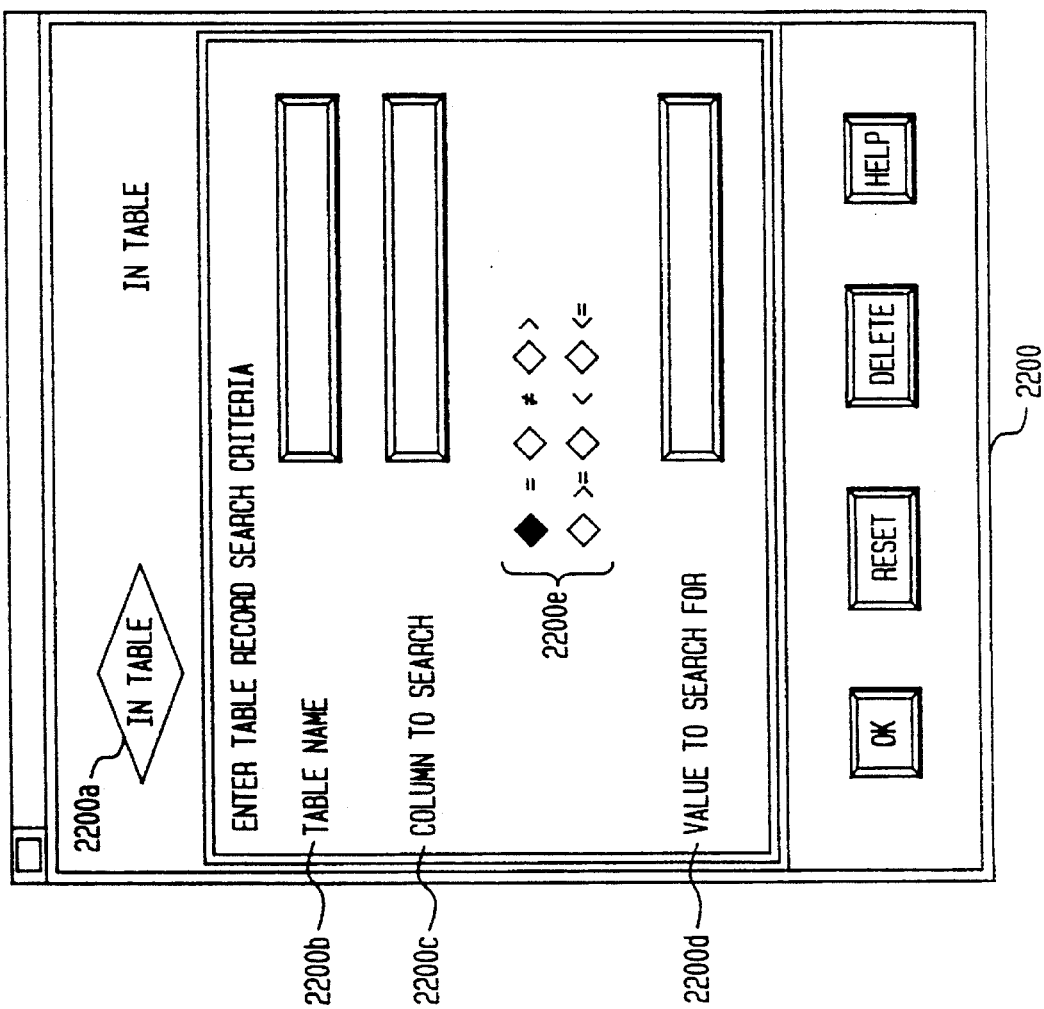
FIG. 25 is an Intable Editor screen in accordance with one embodiment of the present invention.

A user specifies the foregoing criteria using an Intable Node Editor 2200, as shown for example in FIG. 25, which is displayed when a user selects an Intable node from a nodes list.

Intable Node Editor 2200 includes Name field 2200a corresponding to this node type. The table search criteria is inserted in search fields 2200b–e. Table Name field 2200b specifies the table to be searched. Column field 2200c specifies the column or columns of the table to be searched. Value field 2200d specifies a value to be searched for in the specified column. Finally, Expression field 2200e permits a user to specify comparison criteria for the value specified in field 2200d and the values in the table. In a preferred embodiment, the comparison criteria in the Expression field 2200e includes "=," "≠," ">", "<," "≧," and "≦."

Figure 26:
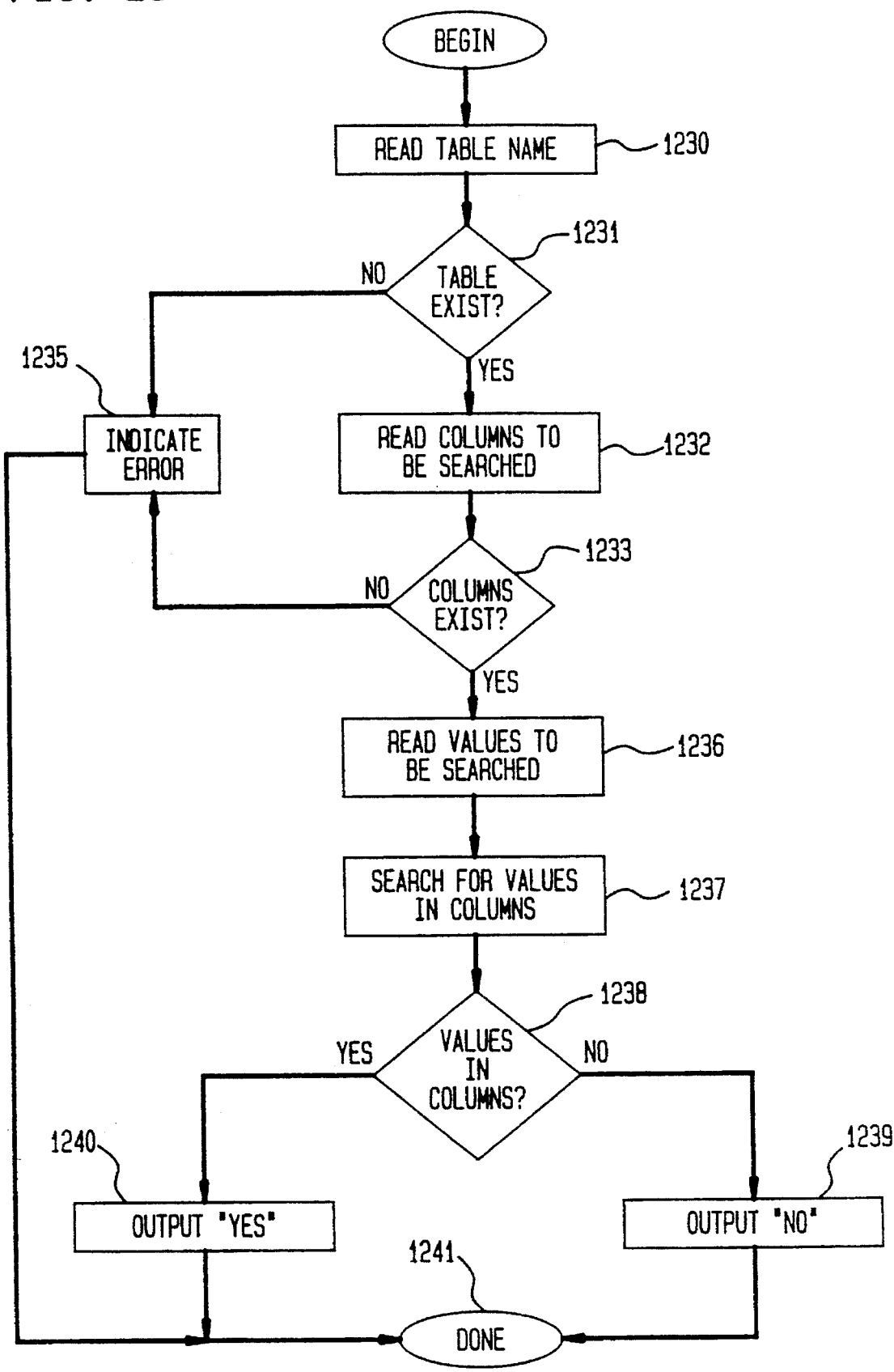
FIG. 26 is a flow diagram illustrating an operation of an Intable node in accordance with one embodiment of the present invention.

In a preferred implementation of the present invention, a method by which the system executing an Intable node searches a designated table and outputs a response is illustrated in the flowchart of FIG. 26. Initially, when executing a table node the system reads the Table name designated by the Intable node (step 1230) and determines whether such a table exists (step 1231). If not, an error is indicated (step 1235). If the table is found, however, the system reads the Column names to be searched (step 1232) and determines whether the Columns exist in the Table (step 1233). If not, an error is indicated (step 1235). Once the Table and Columns are found, the system reads the value(s) to be searched (step 1236), and searches the Table Columns using the expression contained in the Intable node to compare the specified values to values in the Table (step 1237). If the value(s) are found in the Table, the call is processed one way; if the value(s) are not found in the Table, the call is processed another way, as designated by the branches in the graph.

b. Table node

The Table node allows a user to determine whether a row exists in a designated Table that meets certain specified criteria, and, if a row exists, to retrieve a value from one or more of the columns in that row. The retrieved value is used by nodes of a graph which follow the Table node.

Like the Intable node, a Table node has an associated table name and a list of column value pairs. For each column from which values will be retrieved, a call variable is defined. Preferable values for retrieve and search columns are any valid column names within the specified Table. Preferable values for the search values are any valid values for the search column (e.g., a string if the search column contains string data type information) or the name of a call variable (preceded by a dollar sign) whose value is of the same data type as the search column.

Figure 27:
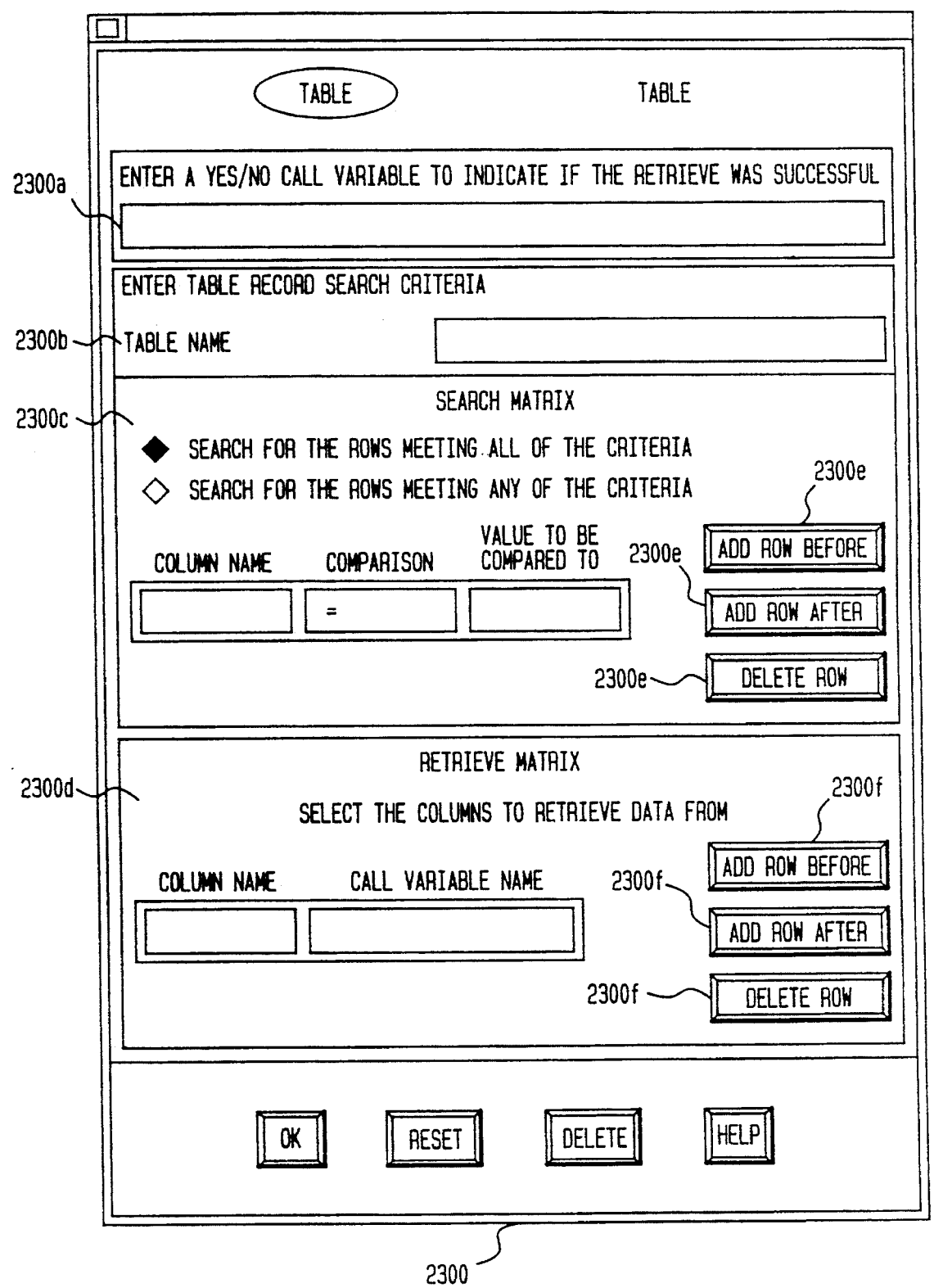
FIG. 27 is a Table Node Editor screen in accordance with one embodiment of the present invention.

When a user selects a Table node from a nodes list, the system displays Table Node Editor 2300, as shown for example in FIG. 27. Unlike an Intable node which return a yes/no boolean value, a Table node retrieves and returns a value from a table. However, field 2300a of the Table Node Editor 2300 allows a user to specify a call variable to which an indication of whether the search was successful can be assigned. In this manner, the user gets "yes/no" search information, similar to an Intable node.

Table Node Editor 2300 also includes a "name" field 2300b, which is used to specify the table to be searched, as well as "search matrix" field 2300c and "retrieve" matrix field 2300d. In search matrix field 2300c, a user specifies the column name, a value to be compared, and a comparison expression, in a manner similar to the Intable Node Editor 2200. Search criteria can be entered or deleted using manipulator button 2300e. Search matrix field 2300c also permits a user to specify whether a search of the table should be made with respect to "all" or "any" of the specified search criteria. In retrieve matrix field 2300d, a user specifies the column name or names of a table from which to retrieve a value and the corresponding call variable name or names to which the retrieved value(s) should be assigned. Additional column names and call variable names can be added or deleted using manipulator buttons 2300f.

Upon execution of a graph having a Table node, the call variables designated by the TABLE node will have either values obtained from the table designated or null values.

Figure 28:
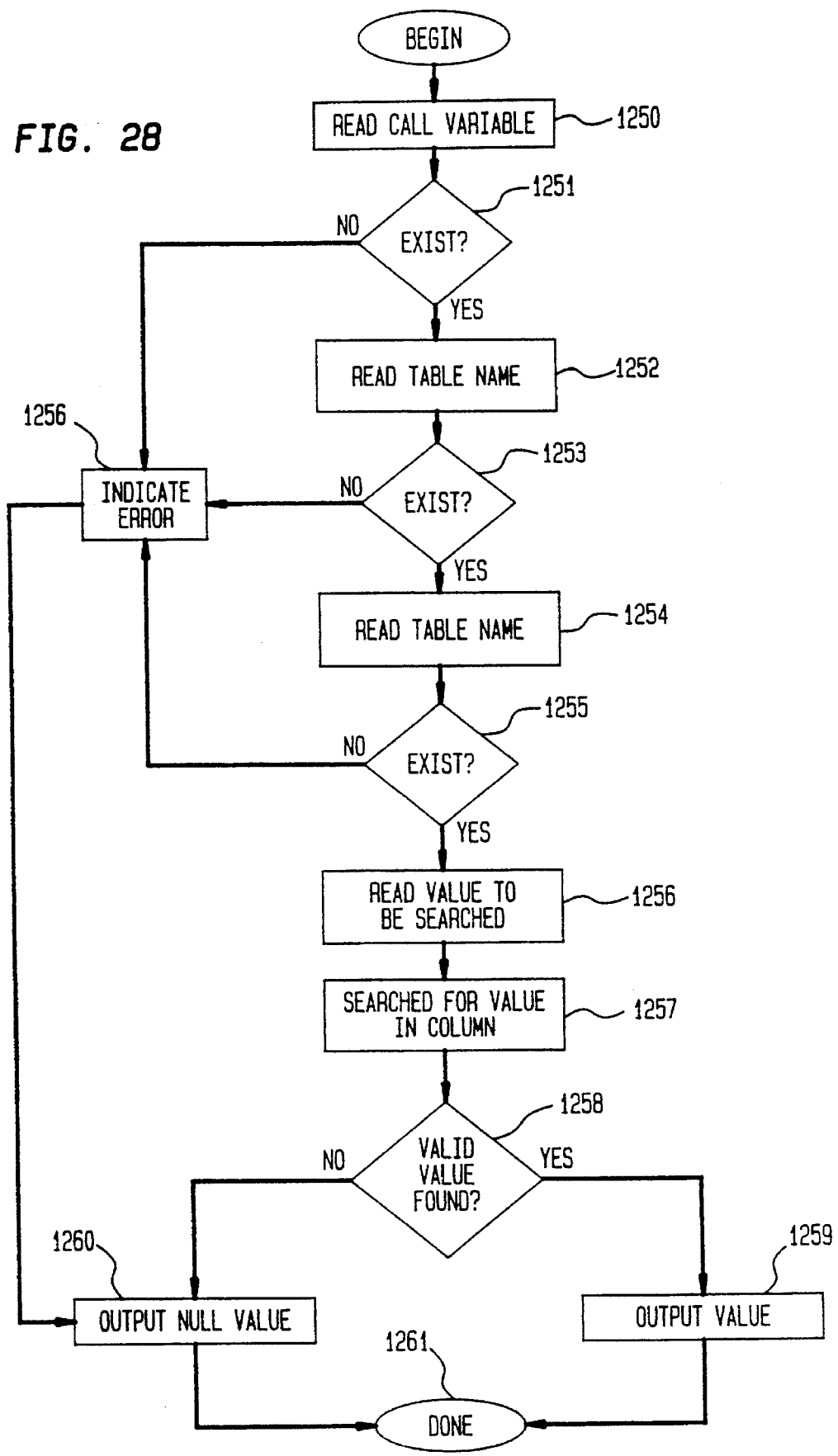
FIG. 28 is a flow diagram illustrating an operation of a Table node in accordance with one embodiment of the present invention.

A preferred method by which the system executing a graph having a TABLE node searches a designated table and outputs a response is illustrated in the flowchart of FIG. 28. Initially, the system sequentially reads the call variables designated in the Table node (step 1250), the table name designated by the Table node (step 1252), and the Column names designated in the Table node (step 1254). After reading each of these designations, the system respectively determines whether each exists (steps 1251, 1253, and 1255). If one does not exist, an error is indicated (step 1256). Once the call variables, table, and column names have been read, the system reads the search values (step 1256) and searches the Table using the comparison expressions contained in the Table node (step 1257). If values are found in the columns which meet the requirements of the search values, the values are output (step 1259). If no such values are found, "null" values are output (step 1260).

G. Templates

Many customers may request the same telecommunication service for mass markets. For example, many customers may wish to designate a long distance carrier during certain times of the day (i.e., business hours). Each customer's graph would therefore be identical except for call variables and nodes and branches defining the carriers and nodes defining the time of day that specified carriers will service the call. All other nodes in the graph and the structure of the graph would be "generic" to the service.

It is impractical and inefficient to require a user to build the same graph for every customer requesting the same service. Accordingly, the present invention provides for templates. Once created and enabled, a template serves as a "form" for creating a customer specific version of a service. Customer specific versions of a service are established by providing values for "customizable" expressions in a node, branch, or call variable within a template. In this manner, the template allows the same service to be provided to more than one customer without having to rebuild the entire graph or redefine generic call variables in the CPR establishing the service. "Customizable" nodes in a template are different from User-defined or "custom" nodes described above. A User-defined or "custom" node is a single node representation having an underlying graph (including more than one node) which defines the "custom" node's functionality. A "customizable" node in a template is a partially defined, single node which is completed by a user during CPR building in accordance with customer specific data. In a like fashion branches and call variables can be made customizable.

Templates are preferably created from preexisting CPRs. To create a template, a user opens the CPR Editor screen 171 and displays a graph from which he or she desires to make a template. With the graph displayed, the user selects the "Operations" option on the menu line 172 of the CPR Editor screen 171 (FIG. 9). In response to this selection, the system displays the Operations menu of suboptions (not shown). One of these suboptions is a "Make Templates" suboption (not shown), which the user selects.

Figure 29A:
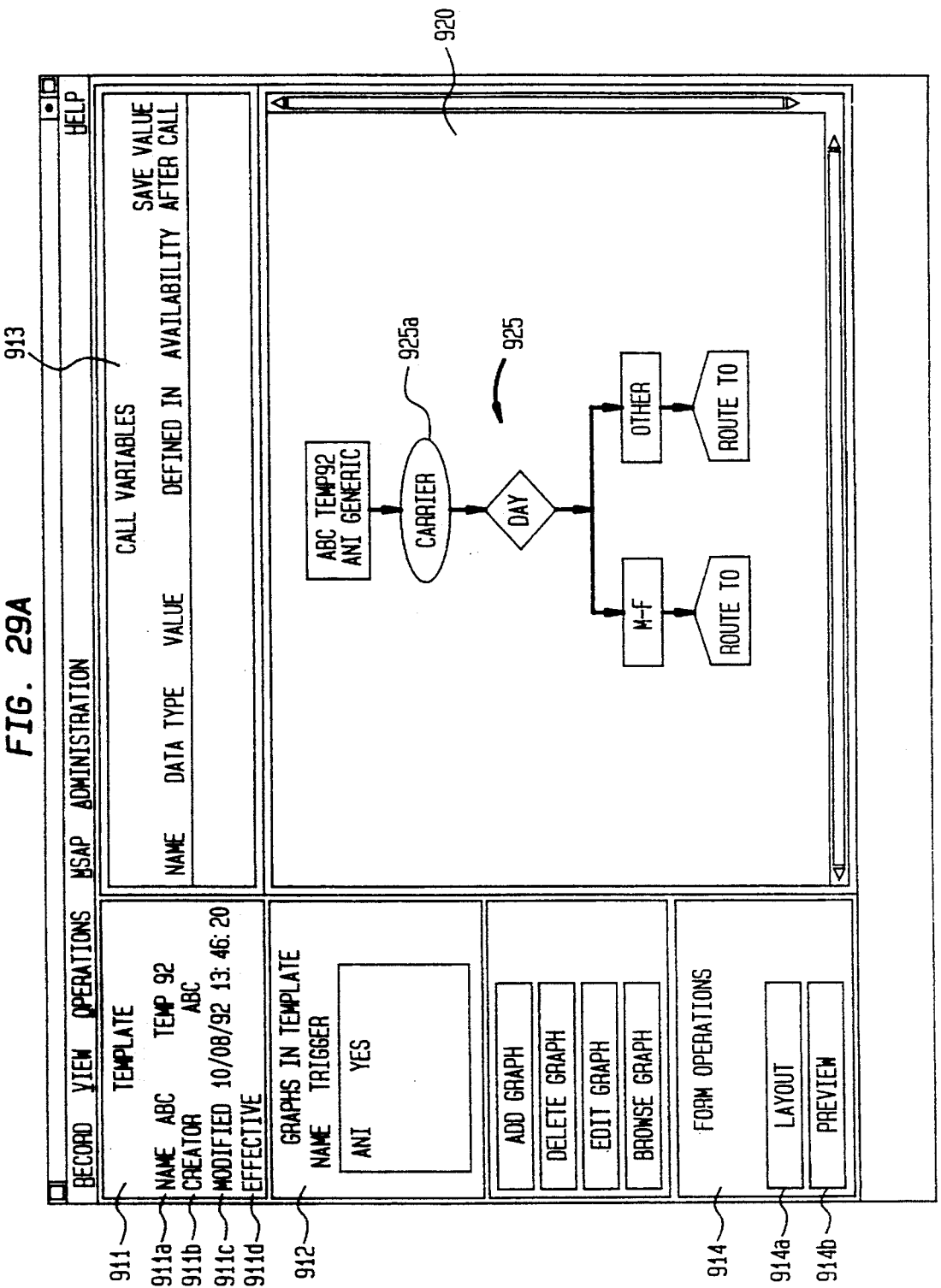
FIG. 29A illustrates a Template Editor screen in accordance with one embodiment of the present invention.

In response to selection of the Make Template suboption, the system displays a Make Template Information Dialog Box (not shown), which prompts the user to enter a name for the template. After the user names the template, a Template Editor screen 910, as shown for example in FIG. 29A, is displayed.

Template Editor screen 910 includes a Template Record Information window 911, a Call Variables window 913, a Graphs In Template window 912, and a Form Operations window 914. The Template Record Information window 911 includes "Name," "Creator," "Modified," and "Effective" fields 911a–d, similar to these same fields for the CPR, GSS, and Custom nodes screens (see FIGS. 9, 10, and 18). The Graphs In Template window 912 and Call Variables window 913 of the Template Editor screen 910 operate in the same way as the Graphs in CPR window 178 and the Call Variables window 190, respectively, of the CPR Editor screen 171 (FIG. 9). Form Operations window buttons 914a and 914b are described below.

The graph 925 from which the template is being created is displayed in Graph window 920. The exemplary graph of FIG. 29A provides for a predetermined carrier for all calls made to a particular telephone number and routes the calls to one of two telephone numbers depending on whether the calls are made on a weekday or weekend. A user from which the template is being created can select which of the nodes of the graph he or she wishes to make customizable by clicking a mouse or similar device on the node.

Figure 29B:
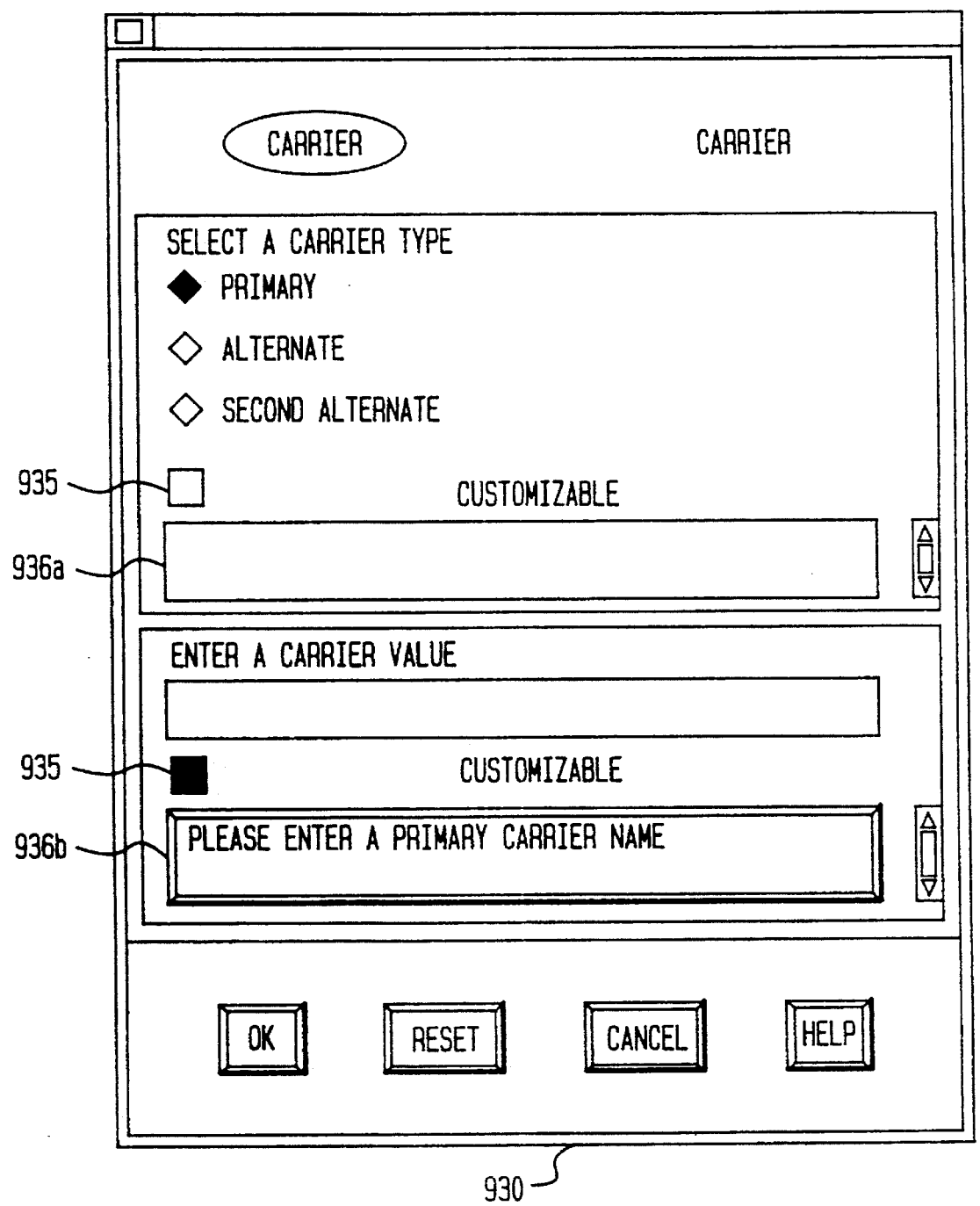
FIG. 29B illustrates a Carrier Node Editor screen for templates in accordance with one embodiment of the present invention.

Each expression in the selected node can be designated as customizable. For example, assume that the template creator selects the "Carrier" node 925a to be customizable. In response to this selection, the system displays a Template Carrier Node Editor 930. Template Node Editors in general differ from CPR Node Editors because Template Node Editors include customizable selection buttons 935, which allow a user to designate which node expressions will be customizable. For example, in FIG. 29B, the carrier type is not customizable, but is fixed as primary. However, the carrier value is customizable. Text fields 936a and 936b are provided to specify a prompt which will be displayed to a user to collect the customizable information for the node.

In like manner, to make a branch a call variable customizable, in response to a selection of the branch or call variable by the user, the system prompts the user to identify the expressions to be made customizable using a Template branch or Template call variable Editor (not shown) similar to the Template node Editor described above. This prompt is used in both a form representation and a graph representation of any CPR based on this template.

Following customization of the node expressions, the user returns to the Template Editor screen 910 wherein node 925a of the displayed graph 925 is preferably indicated as a "customizable" node in the template by means of a different color or different colored border.

As described above and in the set of incorporated patent applications, a user can display a CPR as either a graph or a form representation. A template creator can view the graph representation in the graph window 920, but can also browse and manipulate the form representation using Form Operators window 904.

Figure 29C:
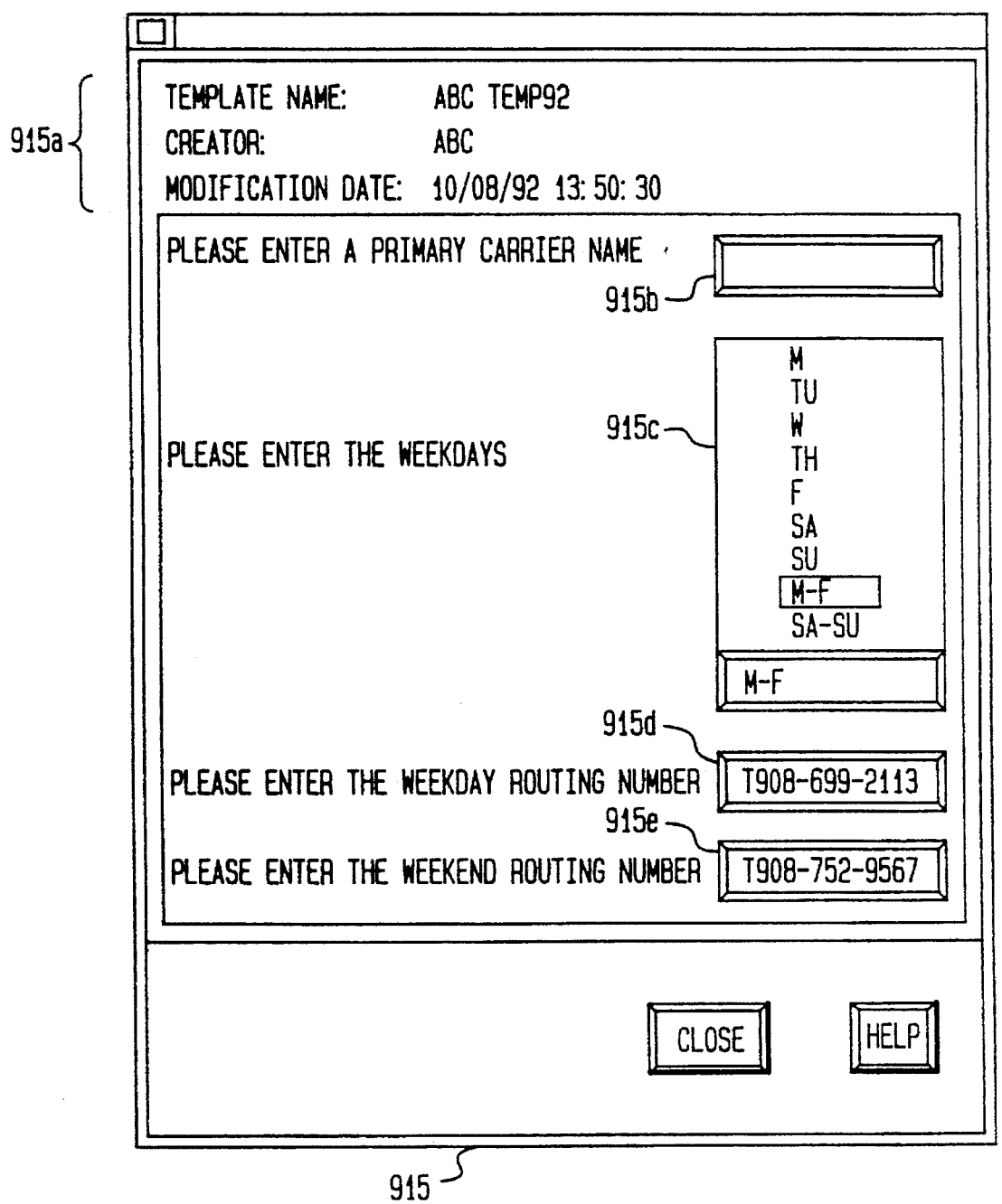
FIG. 29C illustrates a Template Preview Editor screen in accordance with one embodiment of the present invention.

Form Operations window 914 includes "Layout" and "Preview" options 914a and 914b, respectively. Selection of the "Preview" option 914b causes the system to display a Preview Editor 915 as shown for example in FIG. 29c. The Preview Editor 915 displays the CPR in its form representation to the template creator. When initially displayed, because the template is being created from an existing graph, the information fields 915b–915e of the Preview Editor 915 may contain information relating to the existing graph. Because the template creator is creating a template and not an external CPR based on the template, the creator cannot modify the information displayed in the form. In the example of FIG. 29C, the template form tells the template creator that a user using this template to create a CPR will specify a primary carrier (field 915b) and different routing numbers for selected weekdays and weekends (fields 915c–915e). The Preview Editor 915 also includes information field 915a to display the template name, creator, and modification dates.

The layout of the information viewed in the Preview Editor 915 can be modified using the "Layout" option 914a. Selection of the "Layout" option 914a causes the system to display a Layout Editor 916, as shown for example in FIG. 29D. The Layout Editor 916 includes the same fields 915a–d as shown in the Preview Editor 915, and shows the layout of information that will be presented to a user creating a CPR based on a particular template. A set of manipulator buttons 916a is provided to allow the user to change the order of the fields. Preferably, only the order of the entry fields is changed in the Layout Editor 916.

After the user makes "customizable" all the nodes required to transform the CPR graph 925 into an appropriate template, the user enables the template by selecting an Enable suboption (not shown) from the main menu bar "Operations" Menu (not shown). The enabled template is then available for making template-based CPRs and can be stored in the database 203.

Figure 30:
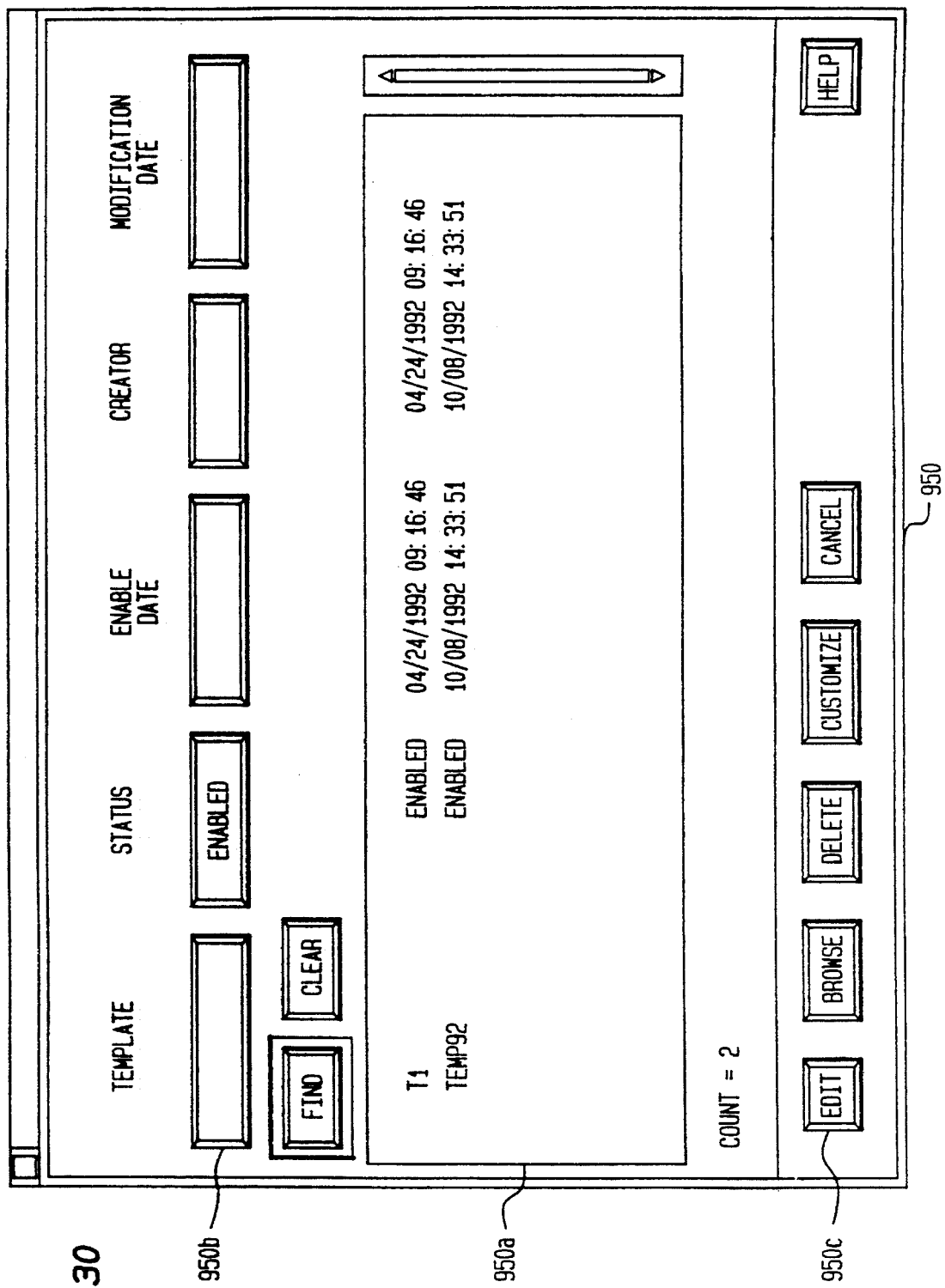
FIG. 30 illustrates a Template Find Editor screen in accordance with one embodiment of the present invention.

A user creates a template-based CPR by selecting the "Find Template" option 178 under the Record menu of the main menu bar 172. Selection of the "Find Template" option causes the system to display a Find Editor 950, as shown for example in FIG. 30, which displays in list window 950a a list of templates stored in database 203. For each template stored in database 203, the system displays the name, status, and creator of the status, as well as dates the template was enabled and modified. Find Editor 950 also includes search fields 950b, which allow a user to designate search criteria to search the template list. Menu buttons 950c permit a user to edit, browse, delete, customize, or cancel a selected template.

A user selects a template by selecting the template name (e.g., mouse click) in the template list 950a and selecting the customize button. In response to these selections, the system displays a New Record Information Dialog Box requesting the user to input a name of the template-based CPR. The user then has the option of viewing the template-based CPR in a graph representation (which looks like the graph 925 shown in FIG. 29A) or in a form representation (which looks very much like the information presented in the Preview Editor 915 (FIG. 29C)). The user can only input values for the expressions and call variables that the template creator indicated as customizable. After inputting the custom values, the user can test, validate, and activate this CPR just like any other CPR.

H. SUMMARY

While there has been illustrated and described what are at present considered to be preferred implementations and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method of creating, in response to inputs from an operator of a telecommunications system, a user-defined call processing node for a call processing record containing logically related nodes and branches, the method comprising the steps, executed by a processor of the system, of:

receiving an instruction from the operator to construct a user-defined call processing node;

presenting to said operator, in response to the instruction, a screen with which to construct the user-defined call processing node;

presenting the operator with a plurality of types of predefined nodes;

receiving from the operator selections of predetermined nodes;

arranging said selected predefined nodes into an underlying representation of call processing procedures;

enabling the underlying representation of call processing procedures as a single node for use in creating call processing records; and requesting the operator to specify parameters for the underlying representation of call processing procedures, said parameters defining call variables for which values can be provided at a later time.

2. The method according to claim 1, further comprising the step of receiving from the operator a parameter name, data type, allowed inputs, and interface type.

3. A method of creating, in response to inputs from an operator of a telecommunications system, a user-defined call processing node for a call processing record containing logically related nodes and branches, the method comprising the steps, executed by a processor of the system, of:

receiving an instruction from the operator to construct a user-defined call processing node;

presenting to said operator, in response to the instruction, a screen with which to construct the user-defined call processing node;

presenting the operator with a plurality of types of predefined nodes;

receiving from the operator selections of predetermined nodes;

arranging said selected predefined nodes into an underlying representation of call processing procedures;

enabling the underlying representation of call processing procedures as a single node for use in creating call processing records; and trace testing the user-defined call processing node, wherein call processing nodes of said underlying representation of call processing procedures are executed during said trace testing step.

* * * * *